(12) United States Patent
Blumenau et al.

(10) Patent No.: US 7,260,636 B2
(45) Date of Patent: Aug. 21, 2007

(54) METHOD AND APPARATUS FOR PREVENTING UNAUTHORIZED ACCESS BY A NETWORK DEVICE

(75) Inventors: Steven M. Blumenau, Holliston, MA (US); John T. Fitzgerald, Mansfield, MA (US); John F. Madden, Jr., Holden, MA (US)

(73) Assignee: EMC Corporation, Hopkinton, MA (US)

( * ) Notice: Subject to any disclaimer, the term of this patent is extended or adjusted under 35 U.S.C. 154(b) by 1022 days.

(21) Appl. No.: 09/748,053

(22) Filed: Dec. 22, 2000

(65) Prior Publication Data

US 2002/0083339 A1   Jun. 27, 2002

(51) Int. Cl.
*H04L 9/00* (2006.01)
(52) U.S. Cl. ..................................... 709/227
(58) Field of Classification Search .................. 710/11; 714/4; 709/225, 218, 229, 227, 228, 220
See application file for complete search history.

(56) References Cited

U.S. PATENT DOCUMENTS

| | | | |
|---|---|---|---|
| 4,280,176 A | 7/1981 | Tan | |
| 4,652,990 A | 3/1987 | Pailen et al. | |
| 4,672,572 A | 6/1987 | Alsberg | |
| 4,919,545 A | 4/1990 | Yu | |
| 5,235,642 A | 8/1993 | Wobber et al. | |
| 5,276,735 A | 1/1994 | Boebert et al. | |
| 5,315,657 A | 5/1994 | Abadi et al. | |
| 5,455,953 A | 10/1995 | Russell | |
| 5,469,576 A | 11/1995 | Dauerer et al. | |
| 5,598,470 A | 1/1997 | Cooper et al. | |
| 5,727,146 A | 3/1998 | Savoldi et al. | |
| 5,737,523 A | 4/1998 | Callaghan et al. | |
| 5,742,759 A | 4/1998 | Nessett et al. | |
| 5,771,291 A | 6/1998 | Newton et al. | |
| 5,771,354 A | 6/1998 | Crawford | |
| 5,784,464 A | 7/1998 | Akiyama et al. | |
| 5,852,715 A | 12/1998 | Raz et al. | |
| 5,864,843 A | 1/1999 | Carino, Jr. et al. | |
| 5,867,686 A | 2/1999 | Conner et al. | |
| 5,889,952 A | 3/1999 | Hunnicutt et al. | |

(Continued)

FOREIGN PATENT DOCUMENTS

EP    0 456 920 A2    11/1991

(Continued)

OTHER PUBLICATIONS

Patent Cooperation Treaty International Search Report.

(Continued)

*Primary Examiner*—Gilberto Barron
*Assistant Examiner*—Thomas M Ho
(74) *Attorney, Agent, or Firm*—Wolf, Greenfield & Sacks, P.C.

(57) ABSTRACT

A method and apparatus for a networked computer system including a plurality of devices and a shared resource. In response to one of the devices attempting to access the shared resource and representing itself to the shared resource as a first device, determining whether the device is attempting to access the shared resource through a physical connection through the network that is different than a physical connection used by the first device to access the shared resource, and when it is, denying the attempted access.

66 Claims, 9 Drawing Sheets

U.S. PATENT DOCUMENTS

| | | |
|---|---|---|
| 5,889,962 A | 3/1999 | Hanif et al. |
| 5,930,786 A | 7/1999 | Carino, Jr. et al. |
| 5,941,947 A | 8/1999 | Brown et al. |
| 5,959,994 A | 9/1999 | Boggs et al. |
| 5,991,876 A | 11/1999 | Johnson et al. |
| 5,999,930 A | 12/1999 | Wolff |
| 6,026,293 A | 2/2000 | Osborn |
| 6,041,346 A | 3/2000 | Chen et al. |
| 6,044,155 A | 3/2000 | Thomlinson et al. |
| 6,061,726 A | 5/2000 | Cook et al. |
| 6,061,753 A | 5/2000 | Ericson |
| 6,061,794 A | 5/2000 | Angelo et al. |
| 6,075,860 A | 6/2000 | Ketcham |
| 6,101,497 A | 8/2000 | Ofek |
| 6,105,027 A | 8/2000 | Schneider et al. |
| 6,141,701 A | 10/2000 | Whitney |
| 6,205,145 B1 * | 3/2001 | Yamazaki .............. 370/395.65 |
| 6,209,002 B1 | 3/2001 | Gagne et al. |
| 6,219,771 B1 | 4/2001 | Kikuchi et al. |
| 6,263,445 B1 | 7/2001 | Blumenau |
| 6,343,324 B1 * | 1/2002 | Hubis et al. ................. 709/229 |
| 6,370,626 B1 | 4/2002 | Gagne et al. |
| 6,401,178 B1 | 6/2002 | Gagne et al. |
| 6,484,245 B1 | 11/2002 | Sanada et al. |
| 6,526,489 B1 | 2/2003 | Kikuchi et al. |
| 6,542,974 B2 | 4/2003 | Gagne et al. |
| 6,581,143 B2 | 6/2003 | Gagne et al. |
| 6,631,477 B1 | 10/2003 | LeCrone et al. |
| 6,684,209 B1 * | 1/2004 | Ito et al. ......................... 707/9 |
| 6,687,718 B2 | 2/2004 | Gagne et al. |
| 6,718,352 B1 | 4/2004 | Dang et al. |
| 6,754,682 B1 | 6/2004 | LeCrone et al. |
| 2002/0083339 A1 | 6/2002 | Blumenau et al. |

FOREIGN PATENT DOCUMENTS

| | | |
|---|---|---|
| EP | 0 580 350 A1 | 1/1994 |
| EP | 0 932 096 A2 | 7/1999 |
| GB | 1 601 956 | 11/1981 |
| GB | 2 262 633 A | 6/1993 |
| JP | 63-301336 A | 12/1988 |
| JP | 1-106245 A | 4/1989 |
| JP | 4-64985 | 2/1992 |
| JP | 5-181609 | 7/1993 |
| JP | 7-325785 | 12/1995 |
| JP | 8-84140 A | 3/1996 |
| JP | 10-333839 A | 12/1998 |
| JP | 11-73391 A | 3/1999 |
| JP | 2001014261 A | 1/2000 |
| WO | WO95/13583 | 5/1995 |
| WO | WO99/13448 A2 | 3/1999 |
| WO | WO 02/08870 A2 | 1/2002 |

OTHER PUBLICATIONS

Translation of Official Action of the German Patent and Trademark Office.

Sutton et al., "Processors Sharing and Partitioning of Main Storage in the MP System", IBM Technical Disclosure Bulletin, vol. 22, No. 5, Oct. 1979, pp. 2009-2010.

"Data Protection at the Volume Level", IBM TDB NN8810146, Oct. 1988, v31, iss. 5, pp. 146-148.

* cited by examiner

| 280 ↓ | 278 ↓ | | 276 ↓ | | |
|---|---|---|---|---|---|
| Locked | HBA FID | HBA WWN | FLAG | LUN BITMAP | 276a |
| Locked | HBA FID | HBA WWN | FLAG | LUN BITMAP | 276b |
| Locked | HBA FID | HBA WWN | FLAG | LUN BITMAP | 276c |
| Locked | HBA FID | HBA WWN | FLAG | LUN BITMAP | 276d |
| Locked | HBA FID | HBA WWN | FLAG | LUN BITMAP | 276e |
| Locked | HBA FID | HBA WWN | FLAG | LUN BITMAP | 276f |
|  |  |  |  |  |  |
|  |  |  |  |  | ⋮ |
|  |  |  |  |  |  |
|  |  |  |  |  |  |
| Locked |  | HBA WWN | FLAG | LUN BITMAP | 276n |

FIG. 7

METHOD AND APPARATUS FOR PREVENTING UNAUTHORIZED ACCESS BY A NETWORK DEVICE

FIELD OF THE INVENTION

This invention relates generally to the field of networked computer systems.

DESCRIPTION OF THE RELATED ART

Computer systems generally include one or more host processors and a storage system for storing data accessed by the host processor. The storage system may include one or more storage devices (e.g., disk drives) to service the storage needs of the host processor. Disk drives may include one or more disks of a recording media, such as a magnetic recording medium or an optical recording medium.

In a typical computer system configuration, a bus provides an interconnect between the host processor and the storage system. The bus operates according to a protocol, such as the Small Component System Interconnect (SCSI) protocol, which dictates a format of packets transferred between the host processor and the storage system. As data is needed by the host processor, requests and responses are forwarded to and from the storage system over the bus.

Networked computer systems have become increasingly popular wherein multiple hosts are coupled over a network to a shared resource such as a shared data storage system. A Fibre Channel fabric is an example of a network that can be used to form such a configuration. Fibre Channel is a network standard that allows multiple initiators to communicate with multiple targets over the network, where the initiator and target may be any device coupled to the network.

Coupling multiple hosts to a shared storage system presents issues relating to the management of data access at the storage system. Specifically, because multiple hosts have access to a common storage system, each host may physically be capable of accessing information that may be proprietary to the other host processors. Thus, various techniques have been implemented to manage access to data in the storage system, in an attempt to prevent unauthorized access by one host to the proprietary data of another. For example, certain portions or zones of memory in the storage system may be dedicated to one or more of the hosts. Each host is 'trusted' to access only those portions of memory for which it has privileges. However, such an approach is vulnerable to the individual actions of each of the hosts. As a result, such a data management method may not be sufficient to protect data from unprivileged accesses.

SUMMARY OF THE INVENTION

One illustrative embodiment of the invention is directed to a method for use in a computer system including a plurality of devices, a shared resource shared by the plurality of devices, and a network that couples the plurality of devices to the shared resource. The method includes acts of: (a) in response to one of the plurality of devices attempting to access the shared resource and representing itself to the shared resource as a first device, determining whether the one of the plurality of devices is attempting to access the shared resource through a physical connection through the network that is different than a first physical connection through the network used by the first device to access the shared resource; and (b) when it is determined in the act (a) that the one of the plurality of devices is attempting to access the shared resource through a physical connection through the network that is different than the first physical connection, denying the attempted access by the one of the plurality of devices to the shared resource.

Another illustrative embodiment of the invention is directed to a method for use in a computer system including a plurality of devices, a storage system shared by the plurality of devices, and a network that couples the plurality of devices to the storage system, wherein the network employs a protocol wherein each of the plurality of devices has a first identifier that uniquely identifies the device in a manner that is independent of a physical configuration of the computer system and a second identifier that uniquely identifies the device in a manner that is dependent upon the physical configuration of the computer system. The method includes acts of: (a) in response to a login of a first device of the plurality of devices to the storage system, storing the first and second identifiers of the first device; (b) in response to an attempt, subsequent to the act (a), by one of the plurality of devices to login to the storage system while representing itself to the storage system as the first device, determining whether the one of the plurality of devices is attempting to login to the storage system through a physical connection through the network that is different than a first physical connection through the network used by the first device to login to the storage system in the act (a) and (c) when it is determined that the one of the plurality of devices is attempting to login to the storage system through a physical connection through the network that is different than the first physical connection, denying the attempted login by the one of the plurality of devices to the storage system. The act (b) includes acts of including acts of: (b1) examining a value of the first identifier presented by the one of the plurality of devices to the storage system to determine that the one of the plurality of devices is representing itself to be the first device; (b2) comparing a value of the second identifier presented by the one of the plurality of devices to the stored value of the second identifier for the first device; and (b3) determining that the one of the plurality of devices is attempting to login to the storage system through a physical connection through the network that is different than the first physical connection when the value of the second identifier presented by the one of the plurality of devices mismatches the stored value of the second identifier for the first device.

A further illustrative embodiment of the invention is directed to a method for use in a computer system including a network and a plurality of devices coupled to the network, the network employing a protocol wherein each of the plurality of devices has a first identifier that uniquely identifies the device in a manner that is independent of a physical configuration of the computer system and a second identifier that uniquely identifies the device in a manner that is dependent upon the physical configuration of the computer system, the network including at least one network component that assigns a unique value for the second identifier to each of the plurality of devices that is logged into the network. The method includes acts of: (a) in response to one of the plurality of devices attempting to login to the network and representing itself to the network as a first device, determining whether the one of the plurality of devices is attempting to login to the network through a port that is different than a first port of the network through which the first device previously logged into the network; and (b) when it is determined in the act (a) that the one of the plurality of devices is attempting to access the network through a port that is different than the first port, denying the attempted login by the one of the plurality of devices to the network.

Another illustrative embodiment of the invention is directed to an apparatus for use in a computer system including a plurality of devices, a shared resource shared by the plurality of devices, and a network that couples the plurality of devices to the shared resource. The apparatus includes: an input to be coupled to the network; and at least one controller, coupled to the input, that is responsive to one of the plurality of devices attempting to access the shared resource while representing itself to the shared resource as a first device, to determine whether the one of the plurality of devices is attempting to access the shared resource through a physical connection through the network that is different than a first physical connection through the network used by the first device to access the shared resource, and to deny the attempted access by the one of the plurality of devices to the shared resource when it is determined that the one of the plurality of devices is attempting to access the shared resource through a physical connection through the network that is different than the first physical connection.

A further illustrative embodiment of the invention is directed to an apparatus for use in a computer system including a plurality of devices, a storage system shared by the plurality of devices, and a network that couples the plurality of devices to the storage system, wherein the network employs a protocol wherein each of the plurality of devices has a first identifier that uniquely identifies the device in a manner that is independent of a physical configuration of the computer system and a second identifier that uniquely identifies the device in a manner that is dependent upon the physical configuration of the computer system. The apparatus comprises: an input to be coupled to the network; a storage device; and at least one controller, coupled to the network and the storage device, that is responsive to a login of a first device of the plurality of devices to the storage system to store the first and second identifiers of the first device in the storage device. The at least one controller is further responsive to an attempt, after the login by the first device, by one of the plurality of devices to login to the storage system, while representing itself to the storage system as the first device, to: examine a value of the first identifier presented by the one of the plurality of devices to the storage system to determine that the one of the plurality of devices is representing itself to be the first device; compare a value of the second identifier presented by the one of the plurality of devices to the stored value of the second identifier for the first device; determine that the one of the plurality of devices is attempting to access the storage system through a physical connection through the network that is different than a first physical connection used by the first device in logging into the storage system when the value of the second identifier presented by the one of the plurality of devices mismatches the stored value of the second identifier for the first device; and deny the attempted login by the one of the plurality of devices to the storage system when it is determined that the one of the plurality of devices is attempting to login to the storage system through a physical connection through the network that is different than the first physical connection.

A further illustrative embodiment of the invention is directed to an apparatus for use in a computer system including a network and a plurality of devices coupled to the network, the network employing a protocol wherein each of the plurality of devices has a first identifier that uniquely identifies the device in a manner that is independent of a physical configuration of the computer system and a second identifier that uniquely identifies the device in a manner that is dependent upon the physical configuration of the computer system, the network including at least one network component that assigns a unique value for the second identifier to each of the plurality of devices that is logged into the network. The apparatus comprises: at least one input to be coupled to at least one of the plurality of devices; and at least one controller that is responsive to one of the plurality of devices attempting to login to the network and representing itself to the network as a first device, to determine whether the one of the plurality of devices is attempting to login to the network through a port that is different than a first port of the network through which the first device previously logged into the network, and to deny the attempted login by the one of the plurality of devices to the network when the one of the plurality of devices is attempting to login to the network through a port that is different than the first port.

BRIEF DESCRIPTION OF THE DRAWINGS

FIG. 7 is a block diagram of an alternate embodiment of a configuration data structure that may be used to store filtering information in accordance with one aspect of the present invention.

DESCRIPTION OF DETAILED EMBODIMENTS

One embodiment of the present invention is directed to a data management method and apparatus for managing accesses by multiple devices (e.g., host processors, file servers and the like) to a shared resource (e.g., a shared storage system). The shared resource selectively services requests from the devices for portions of the shared resource in response to configuration data associated with each of the portions of the shared resource.

In one embodiment, data at the shared resource is apportioned into volumes. Configuration data identifies which volumes of data are available for access by each of the devices coupled to the resource (e.g., over a network). The shared resource includes a filter that selectively forwards a request for servicing depending upon the identity of the device issuing the request and the configuration data associated with the volume to which access is sought. The filter forwards only those requests for access to volumes that the requesting device has privileges to access. Requests to volumes for which the device does not have privileges are not serviced.

Filtering requests at the resource allows the control of the data management to be centralized in one location, rather than distributed throughout the network. In addition, centralizing the data management control at the shared resource (e.g., the storage system) removes the need to trust the hosts seeking access to the shared resource.

In another embodiment of the invention, in addition to filtering requests to support data management at the resource, additional protection may be added to further secure the data at the resource. Specifically, because filtering is performed in response to the identity of the device initiating the request, data security may be compromised if a device falsely represents its identity to gain access to the resource (e.g., engages in spoofing). In one embodiment, a verification method and apparatus is provided to verify the identity of the requesting device to prevent a device from gaining access to proprietary data of another device by mis-representing its identity to the shared resource.

One exemplary system wherein the data management method and apparatus of the present invention may be employed is in a networked computer system, wherein the devices are host processors or file servers coupled to the network, and the shared resource is a storage system (e.g., a disk device storage system). However, it should be appreciated that the use of a network, host processor or shared storage system are not limitations of the present invention, and that such a system configuration is described below solely for purposes of illustration.

Figure 1A:
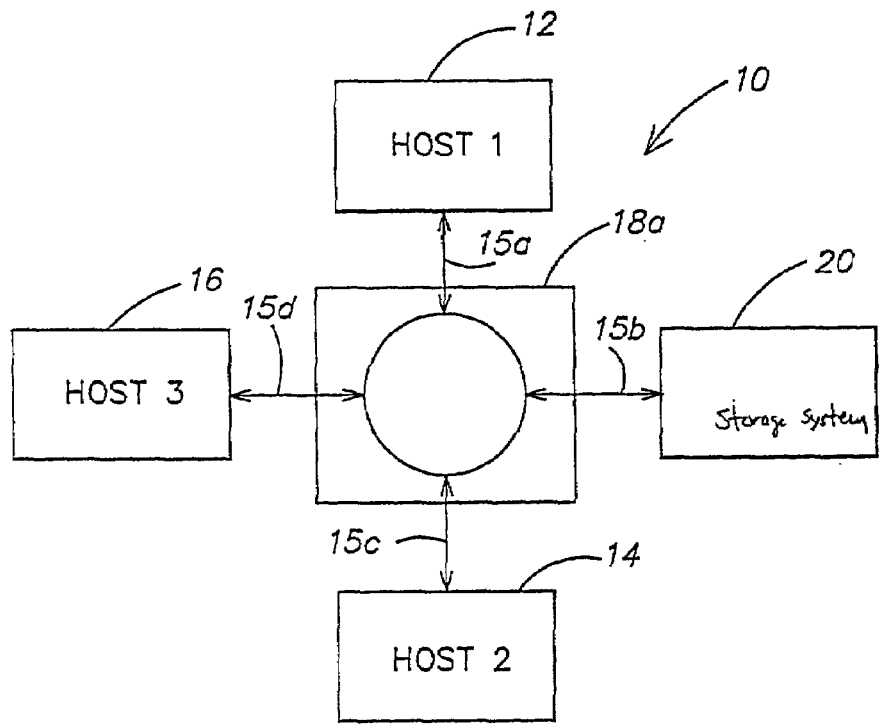
FIGS. 1A, 1B and 1C illustrate exemplary network configurations in which the data management aspect of the present invention can be employed.
Figure 1B:
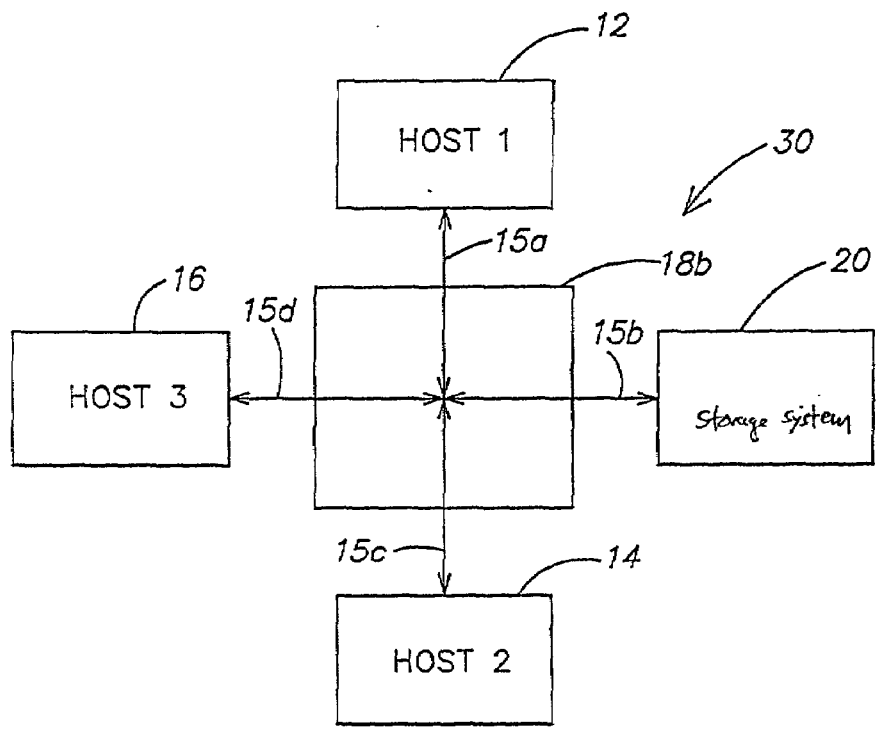
Figure 1C:
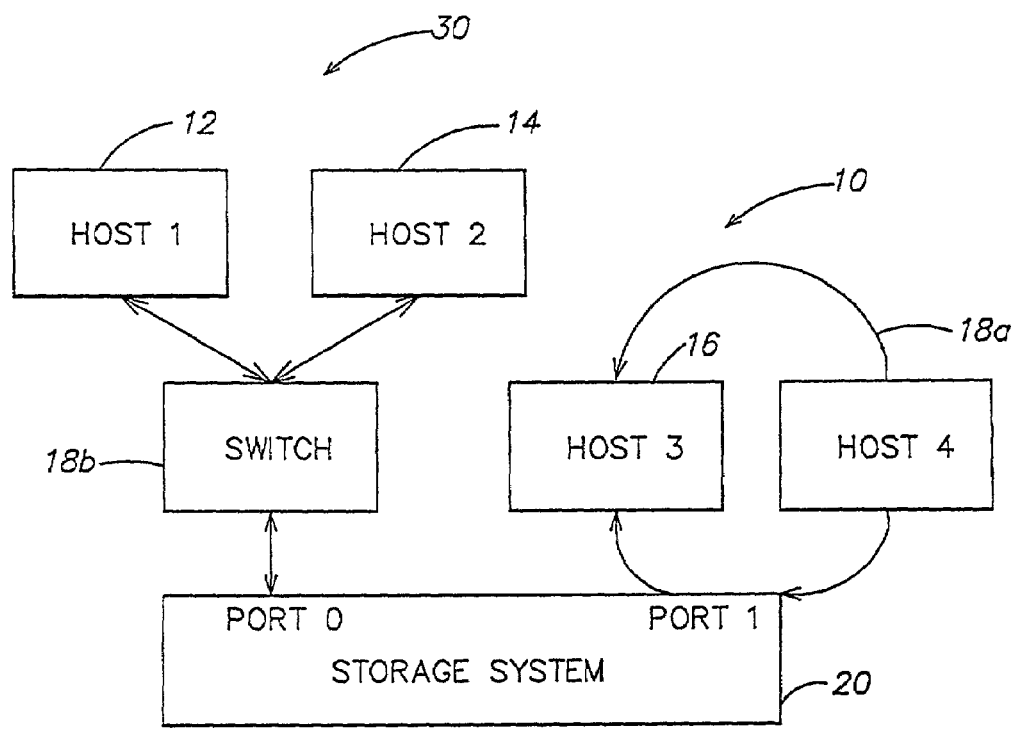

One exemplary network in which the present invention may be employed is a Fibre Channel network, although the present invention is not limited to use with Fibre Channel networks or any other particular network configuration. Three example Fibre Channel network configurations are illustrated in FIGS. 1A, 1B, and 1C. FIG. 1A illustrates a network 10 arranged in a loop configuration, where all devices in the network are coupled together in a single loop. In FIG. 1A, three host processors 12, 14 and 16 are shown coupled to a storage system 20 by a switch or hub 18a. Internally, the hub is arranged in a loop configuration. Communication between the devices, over the busses 15a-15d, is performed by passing data packets from one device to the next in the loop. FIG. 1B illustrates a network 30 arranged in a fabric configuration, where all the devices are coupled together by a switch 18b. Communication between pairs of the devices 12, 14, 16 and 20 in the network 30 is controlled by the switch 18b. FIG. 1C illustrates a host/storage system configuration where the storage system includes two ports, each of which interfaces the storage system to a different network. A first port (Port 0) is coupled to a fabric network 30 and a second port (Port 1) is coupled to a loop network 30. The data management method of the present invention may be employed in networks arranged in any of the configurations illustrated in FIGS. 1A-1C, or in numerous other network or resource sharing configurations.

As mentioned above, the data management aspect of the present invention configures volumes of data at the storage system 20 according to the identity of the host devices that are coupled to the storage system and have access privileges thereto. The configuration data that is used to manage the allocation of volumes to different hosts may be provided, for example, by a system administrator of the network. The system administrator tracks the host devices that are coupled to the network and the available volumes at the storage system. As a new host device enters the network, a login procedure is executed wherein the new host device logs into the network and then further logs into the storage system. The system administrator allocates storage system volumes to the host. The number of volumes allocated to the host may be based, for example, on a requested number of volumes, or on historical data requirements of the host. The system administrator may gain access to the configuration data used to manage the volumes via a management workstation. The management workstation may be located anywhere on the network, as the present invention is not limited to any particular implementation of the management workstation.

Figure 2:
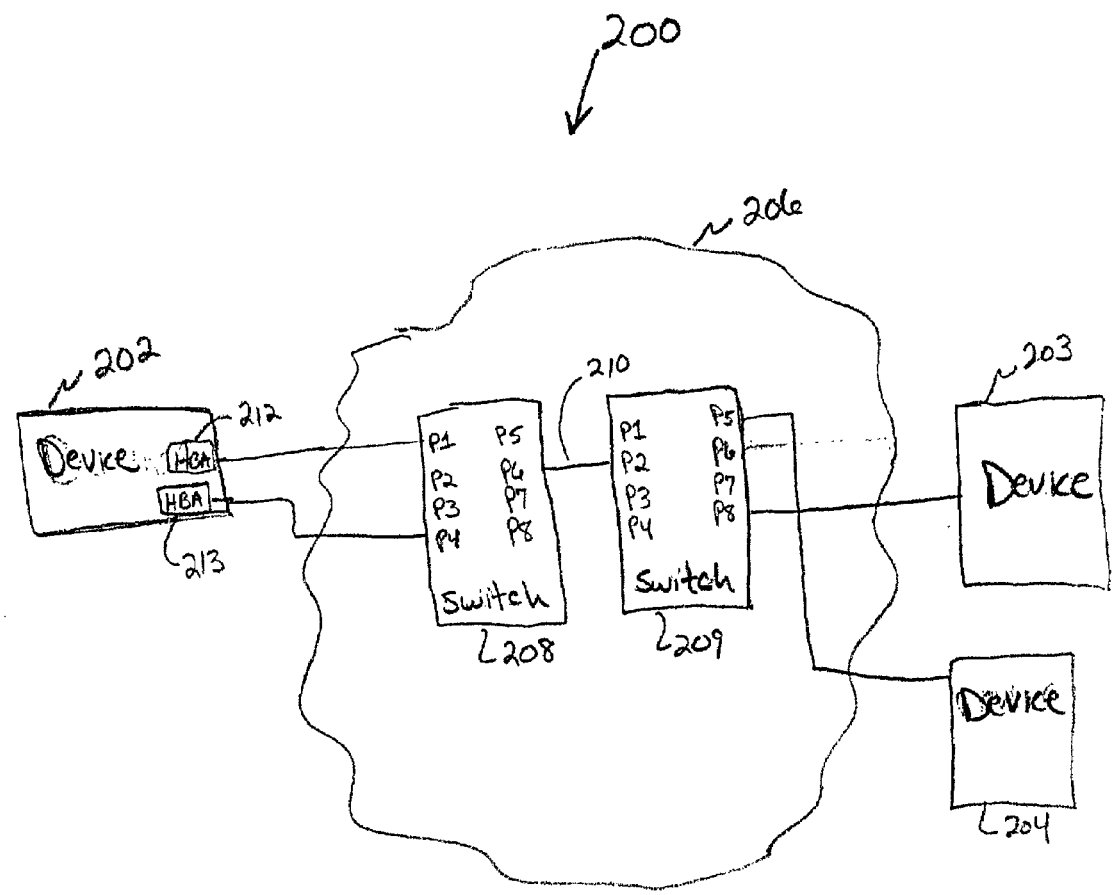
FIG. 2 is a block diagram of a Fibre Channel system on which aspects of the present invention can be employed, and shows the manner in which a fabric is formed by a plurality of switches.

The login process for a new device logging into a Fibre Channel fabric will now be described making reference to FIG. 2. FIG. 2 illustrates a Fibre Channel network 200 including three devices 202-204 interconnected by a fabric 206. While a fabric is generally considered conceptually to be a cloud that interconnects each of the devices coupled thereto in a nebulous manner, the fabric 206 typically is implemented via a series of one or more switches 208-209. Each of the devices 202-204 is connected to one of a plurality of ports (labeled P1-P8 in FIG. 2) of one of the switches 208-209, which creates an entry point for the device into the fabric 206. In addition, various ports of the switches 208-209 may be interconnected as shown at 210 in FIG. 2, to ensure that paths are created between each of the devices in the fabric. In this respect, it should be appreciated that each of the switches 208-209 is capable of passing information between any two of its ports.

According to the Fibre Channel protocol, any device that logs into a Fibre Channel fabric must provide a unique worldwide name (WWN) for each port or adapter of the device that is logging in to the fabric 206. For example, referring to FIG. 2, the device 202 includes a pair of host bus adapters (HBAs) 212-213 that is coupled to the fabric 206 and creates a pair of ports for the device 202 into the fabric. In accordance with the Fibre Channel protocol, each of the HBAs 212-213 is provided with its own unique WWN. Each WWN is assigned by the manufacturer of the device (and/or of the HBA) as part of a registration process that is controlled by the Institute of Electrical and Electronic Engineers (IEEE). The WWN typically includes a number of fields, including a first that uniquely identifies the manufacturer of the device and/or HBA, and a second that distinguishes uniquely among the devices provided by that manufacturer.

As part of the process for logging into a fabric 206, each port of the device provides its WWN to the switch that serves as the entry point for that device port into the fabric 206 (e.g., the HBA 212 of device 202 provides its WWN to the switch 208). In response, the switch provides the logging in port (e.g., the HBA 212) with a fabric identifier (fabric ID) that is a unique identifier within the fabric 206. As discussed further below, the Fibre Channel protocol requires that each packet of information sent between a source and destination device include a unique identifier for both the source and the destination. Since the WWN is intended to provide an identifier that is unique to any device anywhere in the world, it is quite lengthy (e.g., WWNs typically use sixty-four bits, although the Fibre Channel standard can support one hundred twenty-eight bits). Significantly fewer bits are required to uniquely identify each device in a typical fabric. Therefore, the concept of the fabric ID was developed to minimize the overhead in packets transmitted using the Fibre Channel protocol. Thus, according to the Fibre Channel protocol, each packet of information does not include the WWN for the source and destination devices, but rather, includes a fabric ID for each of these devices, which is much shorter (e.g., typically twenty-four bits). As a result, the log in process for logging a device into a fabric 206 involves each port of the device providing its WWN to the switch that provides the entry point for that device port into the fabric 206, the switch selecting a unique fabric ID for that port, and then returning the fabric ID to the device port. Thereafter, the logged in device uses the uniquely assigned fabric ID to conduct its communications through the fabric 206. The switches 208-209 that make up the fabric 206 typically communicate with one another to ensure that unique fabric IDs are provided to every device logged into the fabric 206 (e.g., by ensuring that each switch is provided with a unique offset that will not overlap with any other switch in the fabric, and then by ensuring that each switch maintains a list of the particular identifiers assigned within its offset range).

As each device logs into the fabric, it can query the fabric to identify the other devices coupled to the fabric, and is provided with a list of fabric IDs identifying all of the devices logged into the fabric 206. This information can be used to exchange information between the newly logged in device and the other devices coupled to the fabric 206.

The Fibre Channel protocol is capable of supporting multiple interface command sets. Accordingly, the devices that are coupled together using a Fibre Channel network may communicate using any of a number of higher level protocols including Internet Protocol (IP), SCSI, or any of a number of other protocols, provided that the interfacing devices have knowledge of the type of protocol that is being used on the particular Fibre Channel interconnect. Certain types of devices have historically been designed to communicate using certain protocols. For example, host processor devices have historically communicated with storage systems using the SCSI protocol. Thus, devices coupled using a Fibre Channel network may communicate with each other using the same protocols that have historically been used. As a result, existing interfaces of the devices require little re-design to couple to the Fibre Channel network.

Tunneling techniques typically are used to convert packets of any type of protocol into packets that may be propagated on the Fibre Channel network. Using tunneling, one packet, formatted according to a first protocol, is enveloped in a second packet formatted according to the higher level Fibre Channel network protocol. Thus, a SCSI packet may be enveloped in a Fibre Channel packet by a host processor or storage system for transmission on a Fibre Channel network. One example of a packet formatted according to a SCSI protocol and enveloped in a Fibre Channel packet is illustrated in FIG. 3.

Figure 3:
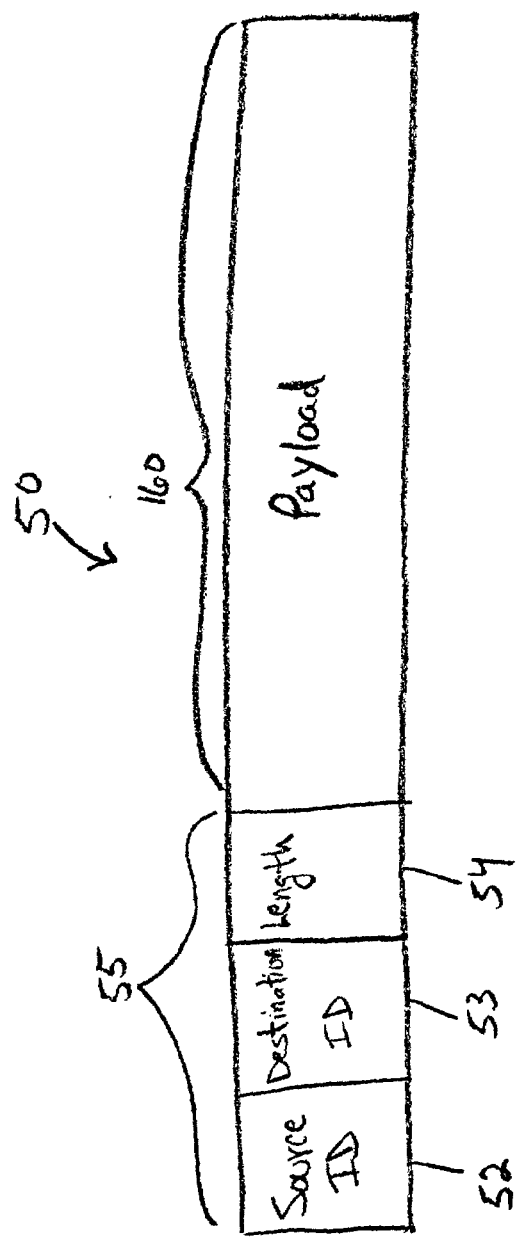
FIG. 3 illustrates one embodiment of a packet in a Fibre Channel system.

In FIG. 3, a Fibre Channel packet 50 includes a header portion 55 and a payload portion 160. The header portion 55 includes a source ID field 52, a destination ID field 53 and a length field 54. The source ID field 52 includes the fabric ID of the device in the network that initiated the transmission of the packet 50, and the destination ID field 53 includes the fabric ID of the target device in the network for receiving the packet. The length field 54 identifies a number of bytes in the packet. Other fields defined in the Fibre Channel specification also may be included in the header, although these fields are omitted herein for clarity.

The source ID field 52 and destination ID field 53 are used, for example in the exemplary system of FIG. 1B, to identify particular host processors and the storage system. When a host issues a request packet to the storage system 20, the source ID identifies the host and the destination ID identifies the storage system. In accordance with one embodiment of the invention, the storage system 20 uses the source ID field 52 of the packet to index into configuration data identifying which of the storage system's volumes of data the requesting host has privileges to access. The configuration data can be used by filter logic at the storage system to selectively service the host's request. Exemplary components of a host and storage system that may be used to implement the method and apparatus for filtering requests based on a host identifier will now be described referring to FIGS. 4-6.

As described above, in one embodiment of the invention, a data management system determines whether a request to the storage system should be serviced based on certain configuration data, which may be updated by the system administrator as hosts login to and out of the storage system. The data management system also includes filter logic for determining, based upon the configuration data, whether a request to the storage system received from the network should be serviced. In one embodiment of the invention, the filter logic and the configuration data are provided within the storage system itself. Alternatively, the filter logic can be provided in a separate unit disposed between the storage system 20 and the network 21, or elsewhere in the network system. The configuration data may be stored anywhere in the network system accessible to the filter logic. The data management system may be implemented in any of a variety of ways, as the present invention is not limited to any particular implementation. For purposes of illustration, one embodiment of a storage system having the data management system integrated therein is illustrated in FIG. 4.

Figure 4:
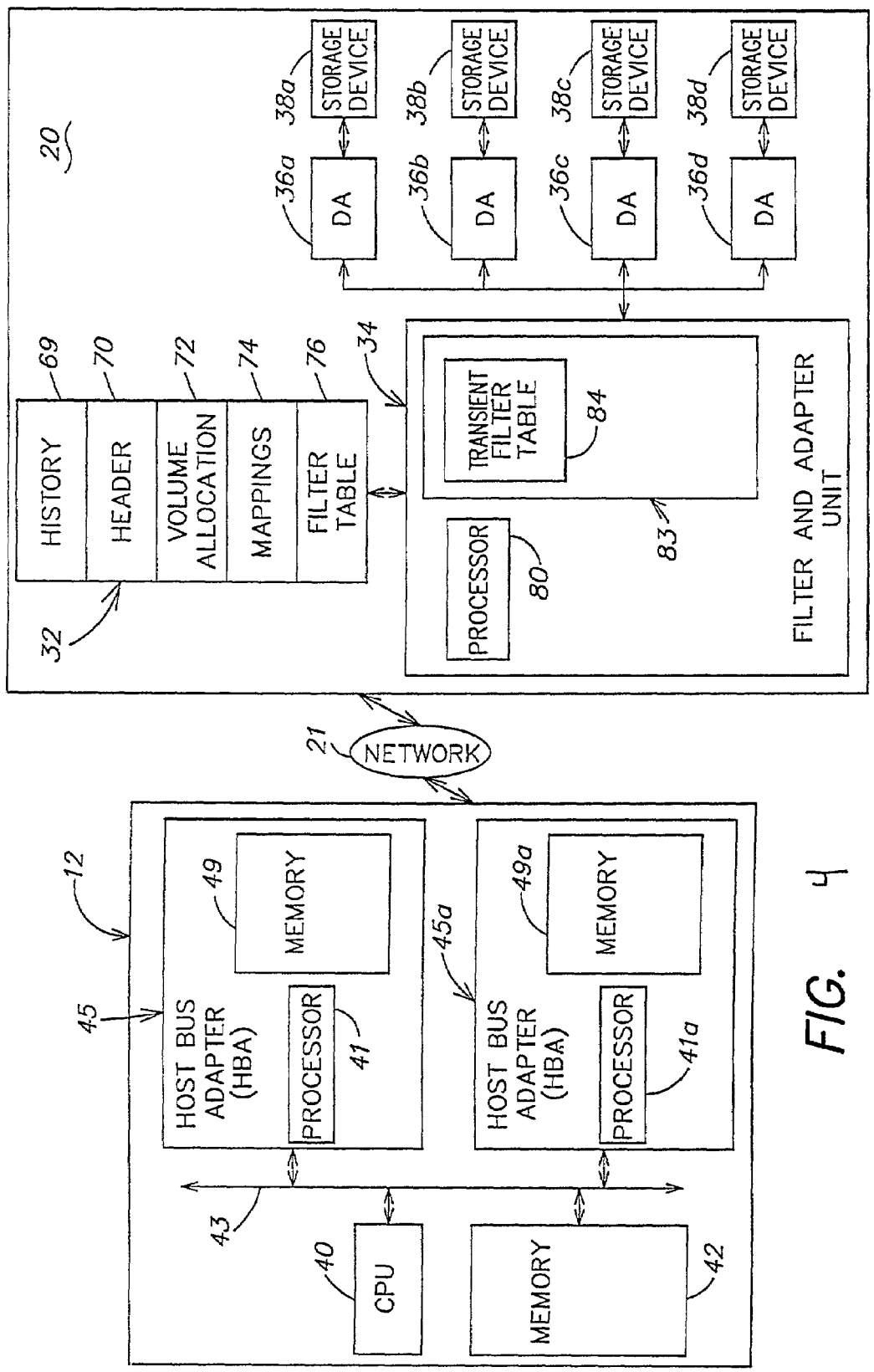
FIG. 4 is a block diagram illustrating exemplary components of a host processor and storage system in a networked system including an adapter having elements for filtering requests issued by the host processor according to one embodiment of the present invention.

FIG. 4 illustrates a host processor 12 coupled to a storage system 20 via a network 21. The network 21 may be, for example, a Fibre Channel network arranged in any of the configurations illustrated in FIGS. 1A-1C and 2. The host processor 12 may be a multi-processing unit, including one or more central processing units such as CPU 40 coupled by a local bus 43 to a memory 42. One or more host bus adapters (HBAs) 45 and 45a are coupled between the bus 43 and the network 21.

Each host bus adapter (HBA) 45 and 45a connects the host processor 12 to the network. The HBAs 45 and 45a translate data received from the CPU 40 into the format dictated by the protocol of the network. In addition, the HBAs 45 and 45a translate data received from the network in packet format into data in a format usable by the CPU 40.

Each host bus adapter may be implemented using a combination of hardware and driver software stored in the HBA or in the memory 42. Alternatively, the host bus adapter may be implemented either entirely in hardware or software. In one embodiment, the HBA 45 includes a processor 41 and a memory 49 coupled thereto. The processor 41 controls the flow and format of data into and out of the HBA 45. The memory 49 stores microcode to control programming of the processor 41 and is used to provide temporary storage of data as it is transferred to and from the network 21. The HBAs 45, 45a generate packets for transmission over the network 21, with each packet including the fabric ID of the HBA in the source ID field to identify the particular HBA as the source of the packet.

The storage system 20 includes storage devices 38a-38d, which may include one or more disk drives or other suitable storage devices. Access to the storage devices 38a38d is controlled through the use of disk adapters 36a-36d, which may be implemented using a programmed processor, a custom hardware design or in any other suitable way. In the embodiment illustrated in FIG. 3, a disk adapter is provided for each storage device 38a-38d. However, it should be appreciated that the present invention is not limited to any particular implementation in this respect. For example, a disk adapter alternatively may be coupled to more than one storage device, and/or one or more of the disk adapters 36a-36d may include secondary connections to the storage devices 38a-38d of another disk adapter 36a-36d, to permit recovery in the event of failure of one disk adapter by shifting its functions to the second disk adapter.

The storage devices 38a-38d may be apportioned into sets of logical volumes. When the HBAs 45, 45a login to the storage system, one or more of the logical volumes is assigned thereto. In one embodiment, references to the logical volumes in the storage system by the HBAs are performed using logical unit numbers (LUNs). There need not be a one-to-one correspondence between the logical unit numbers provided by the HBAs and the physical addresses of the disk devices.

A configuration database 32 (FIG. 4) stores information regarding which HBAs have access to which logical volumes. In one embodiment of the invention, information in the configuration database is received from the system administrator and is periodically updated by the system administrator as the configuration of the network changes.

An example of the types of data that may be stored in the configuration database 32 includes a history table 69. The history table 69 is apportioned into blocks, with one block for each of the ports of the storage system. Each block in the history table 69 includes a list of those hosts that have queried the port as they entered the network. The identification information for each host that is stored in the history table 69 may include, for example, the WWN and the fabric ID of the host.

The configuration database 32 may also include a header portion 70 for mapping the HBAs to the available ports at the storage system 20, a volume allocation portion 72 that allocates logical volumes in the storage system 20 to different HBAs, and a mapping portion 74 that maps LUNs to physical addresses of the disks that store the data for the corresponding logical volume. It should be appreciated that none of the above-described aspects of the configuration database 32 relates specifically to implementing the aspects of the present invention described herein, so that the present invention is not limited to a storage system that is implemented using a configuration database including any of these portions.

Figure 5:
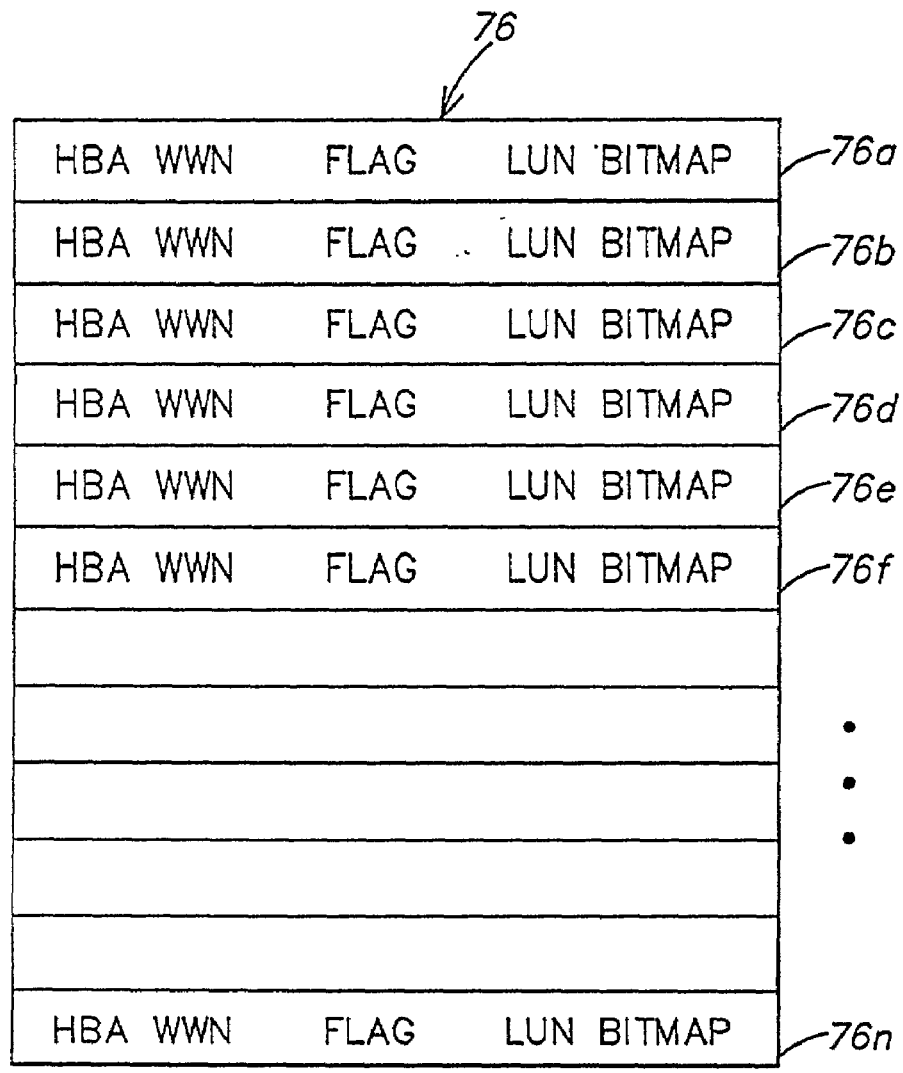
FIG. 5 is a block diagram of one embodiment of a configuration data structure that may be used to store filtering information for use by the storage system of FIG. 4.

In accordance with one aspect of the present invention, a master filter table 76 is provided for controlling which HBAs have access to which of the LUNs. The master filter table 76 is generated using the volume allocation information and includes a record for each HBA that is logged into a port of the storage system and has at least one logical volume allocated thereto. An illustrative implementation of the master filter table 76 is shown in FIG. 5. Each record 76a-76n includes the WWN associated with the corresponding HBA, a flag indicating whether the logical volumes allocated in this entry are shared, and a LUN map identifying which logical volumes the HBA is authorized to access. In one embodiment, the LUN map is in the form of a bitmask with one bit allocated to each LUN in the storage system, and with a bit in the bitmask being set to indicate that the associated HBA (identified by its WWN) has access to the corresponding LUN. However, it should be appreciated that the present invention is not limited to this or any other particular implementation, as the allocated LUNs may be indicated in numerous other ways.

The storage system 20 also includes a filter and adapter unit 34 (FIG. 4). The filter and adapter unit 34 translates packets received from the network 21 into data blocks and control for forwarding to the disk adapters 36a-36d. In addition, the filter and adapter unit 34 performs a filtering function to ensure that only those HBAs with appropriate privileges gain access to any of the logical volumes. Thus, rather than trusting that the HBAs will only attempt to access their assigned volumes, the filter and adapter unit 34 controls access to the logical volumes by filtering out non-privileged requests.

In the embodiment shown in FIG. 4, a single filter and adapter unit 34 is illustrated. However, it should be appreciated that the present invention is not limited in this respect. For example, when the storage system 20 includes multiple ports coupled to the network 21, the filter and adapter unit 34 can be distributed among any number of separate filter and adapter units. For example, a separate filter and adapter unit 34 can be provided for each of the ports that couples the storage system 20 to the network 21, or multiple filter and adapter units can be provided with some assigned to two or more ports. When the filter and adapter unit 34 is distributed among multiple units, the configuration database 32 can be provided in a globally accessible memory that is accessible to each of the separate filter and adapter units 34. In addition, although not shown in the drawings, the storage system 20 can include a cache memory that also is globally accessible to each of the filter and adapter units 34, as well each of the disc adapters 36a-d. In one embodiment of the invention, the cache and the configuration database 32 are provided in the same globally accessible memory, and the globally accessible memory is accessible to the filter and adapter units 34 and the disc adapters 36a-d via a common bus.

In the embodiment shown, the filter and adapter unit 34 includes a processor 80 and a memory 83 coupled thereto. The processor controls the transmission and translation of data between the storage system 20 and the network 21. The memory 83 stores a transient filter table 84 used during the filtering process. When a single filter and adapter unit 34 is provided, the transient filter table 84 may be apportioned into a number of tables, one for each port of the storage system. Alternatively, when a separate filter and adapter unit 34 is provided for each of the ports, each can include its own separate transient filter table 84 with the information relevant to the HBAs logged into that particular port.

As discussed above, the information in the globally accessible master filter table 76 identifies each HBA by its the corresponding WWN, rather than its fabric ID. This is advantageous in that the WWN for an HBA is intended to be a persistent identifier that is independent of the configuration of the Fibre Channel network. Conversely, the fabric ID assigned to a particular HBA may change if the configuration of the fabric changes. For example, referring to the illustrative example in FIG. 2, if the fabric 206 is reconfigured so that the HBA 212 is connected to a different one of the ports P1-P8 of switch 208, a different fabric ID will be assigned to the HBA 212. If the fabric ID for the HBA 212 were used in the master filter table to identify which logical volumes in the storage system 20 are accessible to the HBA 212, a change in the fabric ID would result in the filter and adapter unit 34 not permitting access by the HBA 212 to the volumes of storage previously allocated thereto. Conversely, by using the WWN as the identifier for each HBA in the master filter table 76, the embodiment of the present invention shown in FIG. 5 ensures that even if the configuration of the fabric changes in a manner that results in a change in the fabric ID assigned to an HBA, the information in the master filter table 76 will enable the storage system 20 to recognize a valid attempt to access the previously allocated storage volumes for that HBA.

While its persistent nature makes the WWN for each HBA an advantageous identifier for use in the master filter table 76, it should be appreciated from the foregoing that requests from an HBA to access a logical volume of storage in the storage system 20 do not identify the WWN of the requester. Rather, as discussed above, the Fibre Channel protocol calls for the source ID 52 (FIG. 3) in a request to include the fabric ID for the requesting device, rather than its WWN. Therefore, to enable the filter and adapter unit 34 to process a request for access from an HBA to one or more logical volumes within the storage system 20, the transient filter table 84 is provided with information that identifies each HBA logged into the port or ports managed by the filter and adapter unit 34 by their fabric ID, rather than their WWN. In this respect, the information included in the transient table 84 can be similar to that provided in the master filter table 76, with the exception that each HBA is identified by its fabric ID, rather than its WWN. For example, each entry in the transient filter table 84 can include a flag indicating whether the logical volumes associated with the entry are shared, as well as a LUN bitmap for the HBA identifying which volumes have been allocated thereto. Thus, when a request for access from an HBA to one or more logical volumes within the storage system 20 is received at the storage system, the appropriate filter and adapter unit 34 uses the fabric ID provided in the source ID field 52 (FIG. 3) of the request to index into the transient filter table 84, and the LUN bitmap included in the appropriate entry is examined to determine whether the requesting device is authorized to access the logical volumes it is seeking to access. If the requesting device is so authorized, the request is forwarded by the filter and adapter unit 34 and handled by the storage system 20 in the conventional way. Alternatively, if the requesting HBA does not have the appropriate access privileges, the filter and adapter unit denies the request, and does not forward it to the remainder of the storage system 20, thereby preventing the unauthorized access.

The master field table 76 and the transient filter table 84 are updated when a new HBA logs into the storage system 20. As discussed above, this process can be performed under the control of a system administrator, who can allocate the appropriate number of logical volumes in the storage system 20 to the logging in HBA. As part of the login process, the logging in HBA provides the storage system 20 with both its WWN and its fabric ID. As should be appreciated from the foregoing, the WWN is used to update an appropriate entry in the master filter table 76, while the fabric ID is used to update the corresponding entry in the transient filter table 84. The transient filter table 84 can maintain a key into the master filter table to enable the transient filter table 84 to maintain knowledge about which entries in the master filter table 76 correspond to which entries in the transient filter table 84. This can be done in any of numerous ways, as the present invention is not limited to any specific implementation technique. For example, the transient filter table 84 can include the same number of entries as the master filter table, with the entries organized in the same order, so that the position of a particular entry in the transient filter table 84 can define which entry in the master filter table 76 corresponds thereto.

The transient filter tables 84 can be updated in response to any update being made to the master filter table 76. Specifically, if the system administrator updates the master filter table 76 (e.g., in response to a reconfiguration of the network system), the system administrator can first commit any necessary updates to the master filter table 76, and then can perform a refresh, which will cause each of the filter and adapter units 34 to update the appropriate entries in their transient filter tables 84.

The size of the transient filter table 84 is related to the number of ports provided at the storage system, the number of HBAs supported at each port and the number of LUNs in the storage system. An example configuration of the storage system 20 may include sixteen ports for accessing 4096 LUNs, with each port capable of supporting accesses by thirty two different HBAs. Thus, if such a large transient filter table 84 is stored in a single memory, the access time for each I/O request might be longer than desired.

Figure 6:
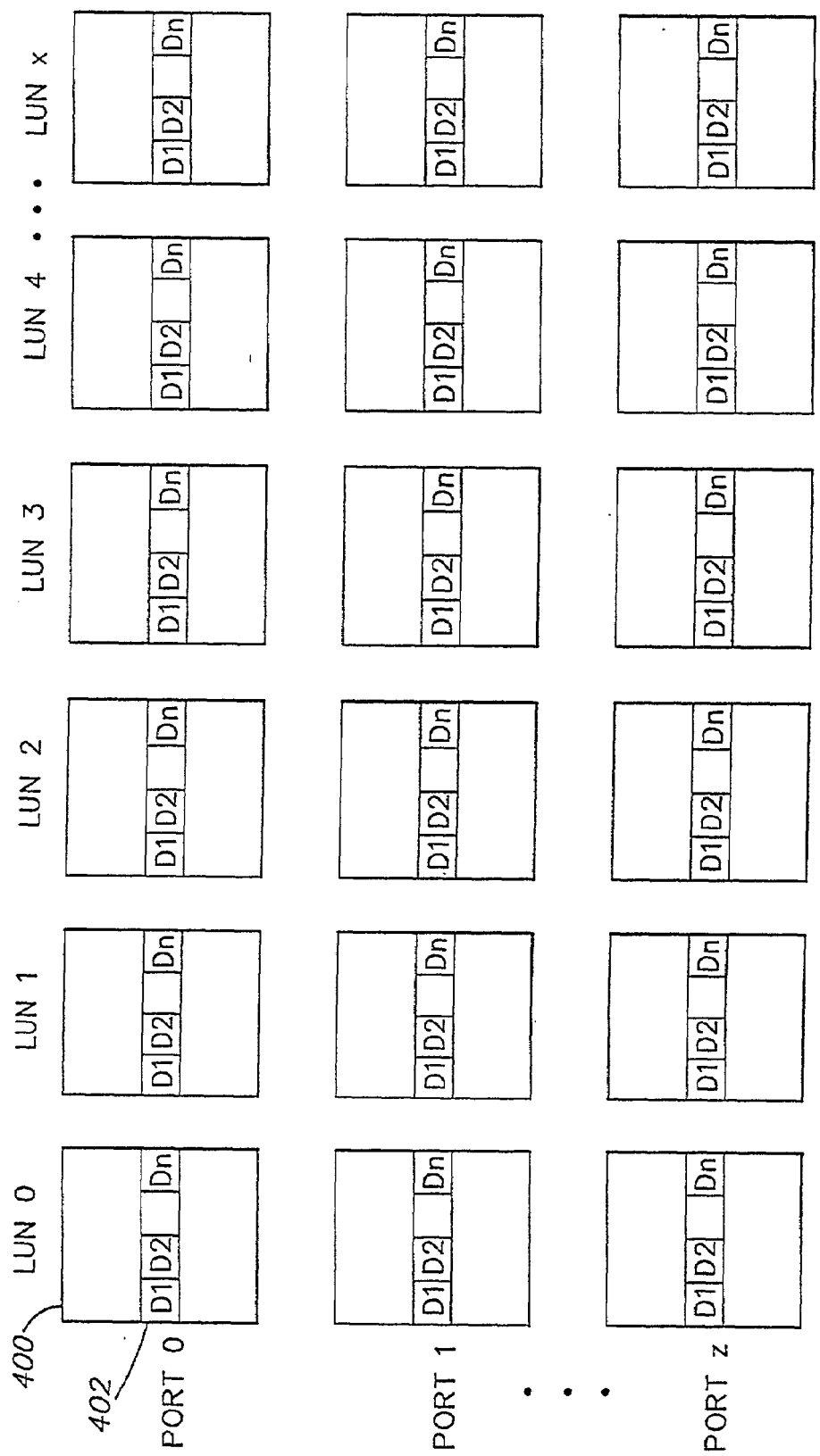
FIG. 6 is a block diagram of one embodiment of filtering data that may be used to filter requests at the storage system of FIG. 4.

In one embodiment of the invention, to increase the response time performance of the storage system 20, the transient filter table 84 is arranged to allow for quick retrieval of the access information for each HBA. Referring now to FIG. 6, one illustrative configuration of the transient filter table is shown. The transient filter table 84 is shown to include an array of records, such as record 400. One column of records is provided for each LUN in the storage system (e.g., storage system 20 in FIG. 4). The LUNs are numbered in FIG. 6 as LUN0 to LUNx, where x+1 is the number of LUNs in the storage system. One row of records is provided for each port of the storage system. Each record includes a bitmap 402. The bitmap includes a number of bits corresponding to the maximum number of devices (HBAs) that can access each port. In FIG. 6, these bits are indicated as D1, D2 . . . Dn, where n is the maximum number of devices that may be coupled to any port.

During operation, as an I/O request is received at the storage system 20, the address of the I/O request is compared with the data in the transient filter table 84. The address includes an identifier of the HBA which initiated the request, and an address to the storage system portion that the host wants to access. This address includes, generally, a Bus/Target/LUN combination of fields. The bus field is the base address of the storage system 20 on the network, the target is the fabric ID of the port of the storage system to which the request is directed, and the LUN indicates the logical volume addressed by the request. The target information (row) and LUN information (column) are used to index into the transient filter table to obtain one of the records. The source ID for the requesting device is then used to select one of the bits in the bitmap 402 of the record 400 selected by the Bus/Target/LUN address to identify whether or not the bit is set in the mapping. If the bit is set in the mapping, then the request is forwarded to the disks for servicing. If not, the request is denied.

The transient filter table 84 may be stored in memory, as illustrated in FIG. 4, or may alternatively be implemented in hardware. While the configuration of the transient database described above provides one method of accessing HBA and LUN mapping information, alternative configurations may also be used, as the present invention is not limited to this implementation. Rather, any configuration database arrangement that allows mapping data to be obtained from the database using a source identifier and a resource address may be used.

It should be appreciated that the embodiment of the invention described above relates to a data management system that prevents a host device from accessing volumes of storage allocated to another device without authorization. The embodiment described above is particularly useful when employed in a relatively secure environment (e.g., where all the host devices are owned by the same enterprise), in which the host devices that share access to a shared resource (e.g., a storage system) via a network can be trusted to not maliciously or intentionally attempt to access or destroy data allocated to other devices. In such relatively secure environments, the embodiment of the invention discussed above guards against unintended mistakes that might cause one of the host computers to unintentionally access volumes of storage allocated to another.

The increased popularity of networked computer systems in general, and Fibre Channel systems providing networked access to shared storage in particular, has resulted in the creation of networked systems wherein multiple hosts that do not trust one another share access to a common storage system. For example, such systems have been implemented by numerous types of service providers that provide computing services to their customers. For example, some service providers provide the infrastructure to support operation of multiple servers for different customers. The infrastructure includes a network that provides access to the Internet, as well as a storage device that is accessible to and shared by the servers of different customers over the network, which may be a Fibre Channel fabric. As a result, the need has arisen for an additional level of protection to be provided for a shared resource (e.g., a shared storage system), to protect against not only inadvertent mistakes in access from relatively friendly or trusted host devices, but to further guard against malicious access to a shared resource from an untrusted competitor or saboteur. Thus, one embodiment of the present invention is directed to a method and apparatus for providing additional lock down protection, to prevent malicious access to a shared resource, such as a shared storage system.

An example of malicious access intended to be guarded against and prevented by one embodiment of the present invention is spoofing, where a malicious host device attempts to take over the identity of another device on the network to bypass various security measures, such as the filtering performed by the filter and adapter unit 34 discussed above. An example of spoofing in the Fibre Channel environment relates to a malicious device attempting to adopt the WWN of another device in the fabric. For example, the Fibre Channel protocol enables any HBA logged into a fabric (e.g., fabric 206 in FIG. 2) to issue a command to the switch that provides its entry point into the fabric requesting an identification of the WWNs of all of the other devices in the fabric. By simply issuing such a command, a malicious device can access the WWN of another device on the fabric that it seeks to impersonate for the purpose of gaining unauthorized access to the portion of a shared resource (e.g., a shared storage system) allocated to the victim device. This is facilitated, in part, by a feature of the Fibre Channel protocol that enables an HBA to set its own WWN. This feature is provided in the Fibre Channel protocol, for example, to enable a failed part to be replaced with a new part that can assume the same WWN, such that the remainder of the system need not be reconfigured to accept the replacement part. However, this Fibre Channel facility creates a security hole, in that the basic assumption that a WWN will provide an identifier that is unique to any given HBA worldwide does not hold true if a spoofing device maliciously takes on the WWN of another device in the fabric in an attempt to bypass security mechanisms that are intended to prevent it from accessing portions of a shared resource that should be accessible only to the spoofed (or victimized) device.

In accordance with one embodiment of the present invention, a technique is employed for locking down a physical configuration of a protected networked device (e.g., an HBA in a Fibre Channel fabric) to ensure that any device that presents a unique identifier assigned to the protected device (e.g., a WWN in a Fibre Channel fabric) accesses the network through the physical configuration expected for the protected device. By doing so, this aspect of the present invention prevents a spoofing device from taking on the identity of another, because the aspects of the present invention described below will detect that the spoofing device is attempting to access certain resources in the network system through a different physical configuration than that employed by the protected device being spoofed. In the illustrative example discussed below, the aspects of the present invention are described in connection with a Fibre Channel system and relate specifically to preventing unauthorized access to a shared storage system. However, it should be appreciated that the present invention is not limited in this respect, and that other implementations can be employed that relate to types of network systems other than Fibre Channel, and/or to types of shared resources other than storage systems.

In accordance with one illustrative implementation for use in connection with a Fibre Channel fabric, Applicants have appreciated that the fabric ID assigned to a particular HBA is, in practice, an indication of the physical port that provides the window into the fabric for that HBA. In this respect, although there is nothing in the Fibre Channel protocol that requires that a fabric ID be persistent, or that repeated logins by an HBA at a same port result in assignment of the same fabric ID, the routines implemented by switch manufacturers for generating fabric IDs have resulted in this being the case. For example, as discussed above, the typical way in which fabric IDs are assigned is that the set of switches (e.g., 208-209 in FIG. 2) in the fabric agree to a series of offsets, so that each has a range of unique fabric IDs, and then each switch assigns a unique fabric ID within that range to each of its ports. Switch manufacturers use an assignment technique that is consistent, such that each port is always assigned the same fabric ID. As a result, the fabric ID assigned to an HBA actually identifies a physical relationship between the HBA and the port of the fabric switch that provides the window into the fabric 206 (FIG. 2) for that HBA.

In accordance with one illustrative embodiment of the invention, a data management technique is employed that is similar in many respects to the embodiments described above, but that employs a revised master filter table 276 as shown in FIG. 7. The master filter table 276 includes an additional field 278 to identify the fabric ID for each of the HBAs that is logged into the storage system and has at least one logical volume allocated thereto. As with the master filter table 76 discussed above in connection with FIG. 5, the master filter table 276 can include a flag indicating whether or not volumes allocated to the HBAs are shared, although this is an optional feature and not required, and a LUN bitmap indicating which volumes of data are accessible to the corresponding HBA. As discussed above, the LUN bitmap is merely one example, as other implementations for identifying the allocated volumes are possible. Finally, in the embodiment shown in FIG. 7, an additional field 280 is provided that is identified in FIG. 7 as a LOCKED field. This is a feature that is employed in accordance with one illustrative embodiment of the present invention discussed below, but is optional and is not required in all embodiments of the invention.

The additional field 278 added to the master filter table 276 is used to verify the identify of any HBA that attempts to login to the storage system 20, to ensure that the HBA is not attempting to spoof the WWN of another HBA. This can be done in any of numerous ways, as this aspect of the present invention is not limited to any particular implementation technique. In one illustrative implementation, this verification process is performed by the filter and adapter unit 34 at login time. In the embodiment of the present invention wherein separate filter and adapter units 34 are provided, each filter and adapter unit can perform a separate verification for any HBA that attempts to login to the port of the storage system 20 corresponding to that filter and adapter unit 34. As with the embodiment discussed above, the filter and adapter unit 34 can be implemented in the storage system 20 as shown in FIG. 4, or can be provided elsewhere in the system (e.g., as a separate stand alone unit between the storage system 20 and the network 21).

When an HBA attempts to login to the storage system 20, the HBA must provide both its WWN and its fabric ID to the storage system 20. Upon receiving the WWN and the fabric ID, the filter and adapter unit 34 performs a search of the master filter table 276, to determine whether there is an existing entry corresponding to the WWN of the HBA attempting to login to the storage system. If such an entry exists, the filter and adapter unit 34 compares the fabric ID for the HBA in the corresponding entry in the table 276 with the fabric ID for the HBA attempting to login to the storage system, and if these fabric IDs do not match, the filter and adapter unit 34 prevents the requesting HBA from logging into the storage system. Conversely, if there is no entry in the master filter table 276 with a WWN that matches that of the requesting HBA, or if there is an entry that matches on both the WWN and the fabric ID of the requesting HBA, the filter and adapter unit 34 allows the requesting HBA to login to the storage system 20.

Figure 8:
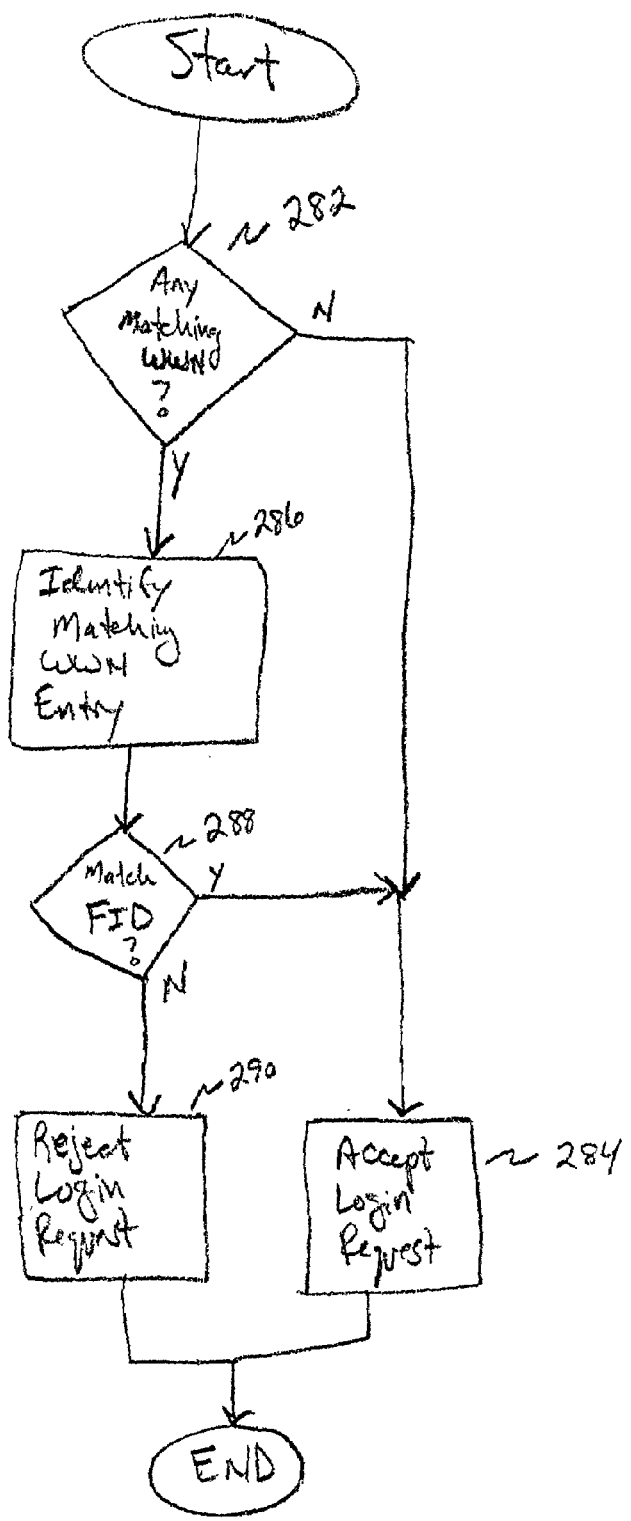
FIG. 8 is a flowchart of a method of verifying the identify of an HBA attempting to login to a network resource in accordance with one embodiment of the present invention.

An illustrative routine that can be implemented by the filter and adapter unit 34, or any other component of the storage system 20 that implements the verification process for an HBA making a login request to the storage system, is illustrated in FIG. 8. This routine is provided merely for illustrative purposes, as it should be appreciated that numerous other implementations are possible. The routine of FIG. 8 is called when a login request is received at the storage system 20, and begins with step 282, wherein a determination is made as to whether there is any entry 276*a-n* in the master filter table 276 which has a WWN that matches that of the login request. If not, the routine proceeds to step 284, wherein the login request is accepted, as the lack of a match on the WWN indicates that the login request is the first received from any device specifying the particular WWN, such that spoofing of that WWN is not a concern.

When it is determined at step 282 that there is a matching WWN in the master filter table 276, the routine proceeds to step 286, wherein the matching entry is identified, and then to step 288, wherein a determination is made as to whether the fabric ID of the matching entry matches that of the login request. When both the WWN and the fabric ID match, the routine proceeds to step 284, to accept the login request. In particular, this condition may result from a situation wherein a device that had previously logged into the storage system is attempting to re-login. This may occur, for example, if there was a problem with power or the network which may have resulted in the HBA having been inadvertently logged out from the storage system 20.

Finally, when it is determined at step 289 that the entry having the matching WWN has a different fabric ID than the login request, the routine proceeds to step 290, wherein the login request is rejected, as this condition may indicate an HBA that is attempting to spoof the WWN of another HBA that has already logged into the storage system 20.

It should be appreciated from the foregoing that performing a verification at login of both the WWN and the fabric ID of the requesting HBA prevents spoofing of the WWN. In particular, the situation where the spoofing risk is greatest is when a valid HBA is already logged into the storage system, and has stored valuable data thereon. A spoofing device would attempt to gain access to the stored data of another device by first learning the WWN of the relevant HBA (e.g., by querying the fabric as discussed above), and then submitting that WWN when logging into the fabric. The fabric will assign the spoofing HBA a different fabric ID than previously was assigned to the protected HBA. Thus, when the spoofing HBA attempts to login to the storage system, the storage system will detect a mismatch of the fabric ID associated with the WWN, and will refuse to allow the spoofing HBA to login to the storage system, and as a result, will prevent the unauthorized access to the data of the protected device.

A shared resource (e.g., a shared storage system) employing the embodiment of the present invention discussed above in connection with FIGS. 7-8 also is protected against a situation where an HBA attempts to spoof both the WWN and the fabric ID for a protected HBA. In switches conventionally employed in creating Fibre Channel fabrics, such a spoofing attack would necessarily fail, and therefore, no additional support need be provided in the storage system to detect such an attempt. Specifically, conventional switches employed in Fibre Channel fabrics prevent a device coupled thereto from using any fabric ID other than the one assigned to it by the switch. Thus, referring to the illustrative example of FIG. 2, if the HBA 212 attempted to spoof the fabric ID of another HBA in the fabric 206, the switch 208 would consider any packets sent by the HBA 212 to be invalid and undeliverable, as they would have a fabric ID that did not match the fabric ID assigned to the HBA 212. Therefore, the HBA 212 would be unable to send any packet of information to another device (e.g., a storage system) with a spoofed fabric ID.

It should be appreciated that by performing a verification process which verifies that a requesting device must have the same physical connection path to the network resource as when it initially logged in, the embodiment of the present invention discussed above provides a significant level of protection. In this respect, prior to the advent of shared network computing systems, various communication media (e.g., SCSI) were employed wherein dedicated physical connections were provided between devices. Such systems were easy to safeguard, since physical security precautions (e.g., locked or guarded rooms) could be employed to ensure that the physical connection to the devices would not be changed, thereby ensuring that the information stored on the system could not be accessed by an unauthorized device. The embodiment of the present invention discussed above in connection with FIGS. 7-8 provides a similar level of security, since the only way a spoofing device can gain access to the portions of a shared resource dedicated to another device would be to physically change the connections of the network, to enable the spoofing device to connect to the shared resource via the same physical network path used by the protected device. Thus, if the users of the computer system can put into place sufficient physical security precautions to prevent the physical reconfiguration of the system, the embodiment of the present invention discussed above can prevent unauthorized access by a spoofing device.

It should be appreciated that while it is desirable to prevent malicious spoofing by ensuring that each WWN is associated with the physical network path to the shared resource initially assigned for that WWN, there are circumstances where users may want to reconfigure their system by physically changing which ports provide the point of entry for a particular HBA, and to do so without losing previously established access privileges (e.g., the allocation of certain logical volumes of storage in the storage device 20 of FIG. 4). Thus, in accordance with one embodiment of the present invention, a technique is employed that enables a user to physically reconfigure the system, without losing access to the logical volumes of storage allocated thereto in the storage system. This can be implemented in any of numerous ways, as this aspect of the present invention is not limited to any particular implementation technique.

In accordance with one illustrative embodiment of the invention, the ability to physically reconfigure the system is enabled through the use of the locked field 280 (which may be a single bit) mentioned briefly above in connection with FIG. 7. In this respect, in accordance with one illustrative embodiment of the invention, when an HBA logs into the storage system 20 (FIG. 4), the relevant information relating to the WWN and the fabric ID of the HBA is loaded into the corresponding entry in the master filter table 276, along with the LUN bitmap identifying the logical volumes of storage allocated thereto. Once this information is established in the master filter table 276, the value in the locked field is set to a value which indicates that the corresponding entry is valid and locked. This can be done, for example, by a system administrator writing to the appropriate entry in the master filter table 276. When the verification process encounters a requesting WWN that matches a locked entry in the master filter table 276 (e.g., in step 282 shown n FIG. 8), the verification process proceeds in the manner discussed above, such that the login request will only be accepted if the fabric ID for the requesting HBA matches the locked entry in the master filter table 276. However, when the locked field indicates that an entry with a matching WWN is not locked, the verification process reacts differently, and simply accepts the new login request (e.g., by immediately proceeding to step 284 in FIG. 8) and updates the appropriate entry in the master filter table 276 with the fabric ID for the logging in device.

Using the locked field 280, a system administrator can physically reconfigure a system by moving an HBA in the following manner. The system administrator writes to the appropriate entry in the master filter table 276 to modify the locked field 280 to unlock the entry, and physically reconfigures the system to the new desired configuration. Next, the HBA logs back into the fabric, which will result in the assignment of a new fabric ID to the HBA. The HBA then logs back into the storage system 20, which will cause a search to be performed of the entries in the main filter table 276 to determine whether there is a match for the WWN of the requesting HBA. When a match is found, an examination is made of the locked field, and since the locked field 280 will indicate that the entry is not locked, the storage system will accept the new login information for the requesting HBA, including the new fabric ID. Thus, the relevant entry in the main filter 276 will be updated with the fabric ID for the HBA, and will keep the appropriate LUN bitmap, which will maintain the HBA's access privileges to the logical volumes of storage previously assigned to it. Finally, the system administrator will write to the relevant entry in the main filter table 276 to change the locked field 280 backed to the locked state, which will prevent a spoofing device from logging into the storage system. The locked field being independently settable for each entry enables the system administrator to unlock the entries on a port-by-port basis, so that the entries for any HBAs not affected by the reconfiguration can remain locked.

It should be appreciated that one function served by the locked field 280 is to enable the filter and adapter unit 34 to distinguish between the following two different types of login requests which each has a WWN that matches an entry in the master filter table 276, but a fabric ID that mismatches on the fabric ID field 278 for that entry: (1) login requests which should be rejected as a potential spoofing attempt; and (2) login requests that should be accepted because they result from an authorized physical reconfiguration of the system. However, it should be appreciated that this result can be achieved in other ways, as the present invention is not limited to employing a locked field 278. For example, another way in which this result can be achieved is that rather than unlocking a particular entry in the master filter table 276 to enable a new login request with a mismatching fabric ID to be accepted, the system administrator can perform a write to the fabric ID field 278 of the appropriate entry, assigning it an invalid value that is unavailable for assignment to any HBA. Such a value can be selected to be any value, so long as all of the entities in the fabric that assign fabric IDs recognize the fabric ID as unavailable. Thereafter, when processing a login request, the filter and adapter unit 34 can perform an additional comparison step to determine whether the appropriate entry in the master filter table is valid. For example, when employing a routine such as that shown in FIG. 8, a step can be added prior to step 288, and can determine whether the fabric ID field 278 of the matching entry is assigned to the invalid value. If so, the routine can proceed immediately to step 284 to accept the login request. In this manner, the system administrator has the capability, on a port-by-port basis, to invalidate an entry in the master filter table 276 to enable the filter and adapter unit 34 to accept a login request from an already recognized WWN, but with a new fabric ID, to facilitate physical reconfiguration of the system. Of course, when the new login request is accepted, only the fabric ID field 278 of the matching entry in the master filter table 276 need be updated, as the remaining information can be retained, so that the logging in device maintains the corresponding LUN bitmap, giving it access to the logical volumes previously assigned thereto.

In accordance with one illustrative embodiment of the present invention, the master filter table 276 can be written to only via a system administrator. The system administrator may gain access to the master filter table 276 via a management workstation, which as mentioned above, may be any user interface associated with the network computer system. For example, when the master filter table 276 and filter and adapter unit 34 are provided in the storage system 20, the user interface can be provided as a service processor or other user interface associated directly with the storage system 20 (FIG. 4), or the user interface can be provided as a stand-alone computer (e.g., a personal computer) that can be coupled to the storage system via the network 21 (FIG. 4). When additional HBAs are added to the network system, or the system is physically reconfigured, the system administrator can take the appropriate actions to update the master filter table 276 in the storage system 20 in the manner discussed above.

In another embodiment of the present invention, an automatic update feature is provided for the master filter table 276. This automatic update feature combines the use of the locked field 280 and the pre-selected invalid value for the fabric ID field 278 discussed above. This embodiment has essentially three states that an entry 276a-n in the master filter table 276 can assume: (1) a locked state with a valid value in the fabric ID field 278; (2) a locked state with the pre-selected invalid value in the fabric ID field 278; and (3) an unlocked state. When in the first state (i.e., locked with a valid entry in the fabric ID field 278), this embodiment of the invention works in the same way as the locked state discussed above. That is, a login request that does not match on both the WWN and the fabric ID for an entry will be rejected, such that a login request can only be accepted if it matches on both the WWN and the fabric ID.

When an entry in the master filter table 276 is in the second state (i.e., locked but with the invalid value in the fabric ID field 278), then any login request that has a WWN that matches that of the entry will be accepted, and the entry automatically will be updated with the fabric ID of the logging in device. This implements an automatic update feature, as the system administrator need not change the locked field 280 to lock down the entry in the master filter table 276 after it has been updated. Rather, in contrast with the embodiment of the invention discussed above, rather than unlocking an entry to enable reconfiguration of the system, the system administrator can invalidate the fabric ID field 278. Thereafter, when a device logs in, the master filter table 276 automatically will be updated with the new fabric ID.

Finally, the unlocked state essentially turns off the lock down protection provided by this embodiment of the present invention, such that any login request is accepted, even if there is no match on the fabric ID.

As should be appreciated from the foregoing, the embodiments of the present invention discussed above provide a verification process which ensures that any requesting device is what it purports to be. One advantage of the implementations described above is that the verification process works on every single request issued from an HBA to the storage system, thereby providing a level of protection that others have tried to achieve by using various complex authentication and validation processes, including the use of encryption, digital signatures, managed keys, etc. By contrast, the embodiments of the present invention discussed above can be implemented with modest additions of hardware and/or software and can execute quickly, so as to not negatively impact the performance of the system.

The specific implementations of the embodiments of the present invention discussed above provide a verification of the physical path between the requesting HBA and the storage system solely by verifying the physical port of entry for the requesting HBA into the network. However, it should be appreciated that the present invention is not limited in this respect, as other implementations can be employed to verify that the requesting HBA is connected to the shared resource through other required physical connections (e.g., physical connections between switches that comprise the network).

In addition, in the illustrative example discussed above, the particular network described is a Fibre Channel fabric. However, it should be appreciated that the aspects of the present invention discussed above are not limited in this respect, and can be employed with other types of network systems. For example, one embodiment of the present invention relies upon a unique worldwide identifier for a particular HBA (e.g., WWN), as well as some technique for verifying a physical connection between the HBA and a shared resource (e.g., the fabric ID). The physical connection can be verified in any of numerous ways in connection with other types of networks, including by adding an additional layer to any existing network protocol that does not currently have some capability of identifying a physical connection through a network.

In the illustrative embodiments discussed above, the shared resource is a storage system. However, it should be appreciated that the embodiments of the present invention discussed above are not limited to use with a storage system, and can be employed for verifying access to any shared resource.

In the embodiments of the present invention discussed above, the verification process is performed directly at the shared resource (e.g., at the storage system). However, it should be appreciated that the present invention is not limited in this respect, as the verification process can be performed elsewhere in the system. For example, in an alternate embodiment of the present invention, a switch (e.g., switch 208-209 in FIG. 2) can be provided with a filter table including some of the information of FIG. 7 (e.g., the flag and the LUN bitmap need not be provided), and can be provided with a programmed processor and/or hardware to perform a routine similar to that of FIG. 8. Specifically, the switch can keep its own table of WWNs and the fabric IDs assigned thereto, and can perform a comparison each time an HBA attempts to login to the network. Thus, if there is already a valid fabric ID assigned to a particular WWN and another HBA attempts to login to the network using the same WWN, the switch can refuse the attempted login, and can refuse to issue a fabric ID to the requesting HBA. As a result, the requesting HBA would not be able to spoof the WWN. Thus, it should be appreciated that the aspects of the present invention discussed above can be implemented in numerous other places within the network, and are not limited to being implemented at the shared resource.

In accordance with one embodiment of the present invention, a user interface can be employed for use with the illustrative embodiments discussed above. An example of a user interface is that it is suitable for use in connection with embodiments of the present invention discussed above is described in co-pending applications Ser. No. 09/345,254, entitled "METHOD AND APPARATUS FOR DETERMINING AN IDENTITY OF A NETWORK DEVICE", filed Jun. 30, 1999, which is hereby incorporated herein by reference. However, it should be appreciated that the present invention is not limited to using this or any other particular type of user interface.

The above-discussed embodiments of the present invention can be implemented in any of numerous ways. For example, the above-discussed routines for verifying that a requesting device has the same physical connection path to the network resource as when it initially logged can be implemented in hardware, software, or a combination thereof, either included within the storage system or some other device in the networked computer system, or can be distributed throughout the system. When implemented in software, the routines can be executed on any suitable processor, such as a processor within the storage system, a dedicated server or any other processor. Any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above. In this respect, one implementation of the present invention comprises at least one computer readable medium (e.g., a computer memory, a floppy disc, a compact disc, a tape, etc.) encoded with a computer program that, when executed on a processor, performs the above-discussed functions of the present invention. The computer readable medium can be transportable such that the program stored thereon can be loaded onto any computer system resource to implement the aspects of the present invention discussed above. The term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and the scope of the invention. Accordingly, the foregoing description is provided by way of example only, and is not intended to be limiting. The invention is limited only as defined by the following claims and the equivalents thereto.

The invention claimed is:

1. A method for use in a computer system including a plurality of devices each having a first identifier that uniquely identifies the respective device, a shared resource shared by the plurality of devices, and a network that couples the plurality of devices to the shared resource, the network assigning a second identifier to each of the plurality of devices, the second identifier indicating a port of at least one network component through which the respective device accesses the network, the method including acts of:

(a) in response to one of the plurality of devices attempting to access the shared resource and representing itself to the shared resource as a first device using the first identifier, determining, using the second identifier, whether the one of the plurality of devices is attempting to access the shared resource through a port of the at least one network component that is different than a first port of the at least one network component used by the first device to access the shared resource; and (b) when it is determined in the act (a) that the one of the plurality of devices is attempting to access the shared resource through a port of the at least one network component that is different than the first port, denying the attempted access by the one of the plurality of devices to the shared resource.

2. The method of claim 1, wherein the attempted access by the one of the plurality of devices is an attempt to login to the shared resource, and wherein the act (b) includes an act of:

when it is determined in the act (a) that the one of the plurality of devices is attempting to login to the shared resource through a port of the at least one network component that is different than the first port, denying the attempted login by the one of the plurality of devices to the shared resource.

3. The method of claim 1, wherein the network is a Fibre Channel fabric, wherein the one of the plurality of devices and the first device each has an assigned world wide name (WWN) as the first identifier and a fabric identifier (fabric ID) as the second identifier;

wherein the method further includes a step of storing the WWN and the fabric ID of the first device in response to an access by the first device to the shared resource; and wherein the act (a) is performed in response to an access, that occurs after the access by the first device, by the one of the plurality of devices to the shared resource and includes acts of:

examining a value of the WWN presented by the one of the plurality of devices to the shared resource to determine that the one of the plurality of devices is representing itself as being the first device;

comparing a value of the fabric ID presented by the one of the plurality of devices to the stored fabric ID for the first device; and determining that the one of the plurality of devices is attempting to access the shared resource through a port of the at least one network component that is different than the first port when the value of the fabric ID presented by the one of the plurality of devices mismatches the stored fabric ID for the first device.

4. The method of claim 1, wherein the network employs a protocol wherein the first identifier uniquely identifies the device in a manner that is independent of a physical configuration of the computer system and the second identifier uniquely identifies the device in a manner that is dependent upon the physical configuration of the computer system;

wherein the method further includes a step of storing the first and second identifiers of the first device in response to an access by the first device to the shared resource; and wherein the act (a) is performed in response to an access, that occurs after the access by the first device, by the one of the plurality of devices to the shared resource and includes acts of:

examining a value of the first identifier presented by the one of the plurality of devices to the shared resource to determine that the one of the plurality of devices is representing itself to be the first device;

comparing a value of the second identifier presented by the one of the plurality of devices to the stored value of the second identifier for the first device; and determining that the one of the plurality of devices is attempting to access the shared resource through a port of the at least one network component that is different than the first port when the value of the second identifier presented by the one of the plurality of devices mismatches the stored value of the second identifier for the first device.

5. The method of claim 1, wherein the shared resource is a storage system;

wherein the act (a) includes an act of, in response to the one of the plurality of devices attempting to access the storage system and representing itself to the storage system as the first device, determining whether the one of the plurality of devices is attempting to access the storage system through a port of the at least one network component that is different than a first port of the at least one network component that the first device uses to access the storage system; and wherein the act (b) includes an act of, when it is determined in the act (a) that the one of the plurality of devices is attempting to access the storage system through a port of the at least one network component that is different than the first port, denying the attempted access by the one of the plurality of devices to the storage system.

6. The method of claim 5, wherein the acts (a) and (b) are performed by the storage system.

7. The method of claim 5, wherein the acts (a) and (b) are performed outside of the storage system.

8. The method of claim 7, wherein the acts (a) and (b) are performed by a device disposed between the storage system and the network.

9. The method of claim 2, wherein the network is a Fibre Channel fabric, wherein the one of the plurality of devices and the first device each has an assigned world wide name (WWN) as the first identifier and a fabric identifier (fabric ID) as the second identifier;

wherein the method further includes a step of storing the WWN and the fabric ID of the first device in response to a login by the first device to the shared resource; and wherein the act (a) is performed in response to a login attempt, that occurs after the login by the first device, by the one of the plurality of devices to the shared resource and includes acts of:

examining a value of the WWN presented by the one of the plurality of devices to the shared resource to determine that the one of the plurality of devices is representing itself as being the first device;

comparing a value of the fabric ID presented by the one of the plurality of devices to the stored fabric ID for the first device; and determining that the one of the plurality of devices is attempting to login to the shared resource through a port of the at least one network component that is different than the first port when the value of the fabric ID presented by the one of the plurality of devices mismatches the stored fabric ID for the first device.

10. The method of claim 9, wherein the shared resource is a storage system;

wherein the act (a) includes an act of, in response to the one of the plurality of devices attempting to login to the storage system and representing itself to the storage system as the first device, determining whether the one of the plurality of devices is attempting to login to the storage system through a port of the at least one network component that is different than a first port of the at least one network component used by the first device to access the storage system; and wherein the act (b) includes an act of, when it is determined in the act (a) that the one of the plurality of devices is attempting to login to the storage system through a port of the at least one network component that is different than the first port, denying the attempted login by the one of the plurality of devices to the storage system.

11. The method of claim 10, wherein the acts (a) and (b) are performed by the storage system.

12. The method of claim 10, wherein the acts (a) and (b) are performed by a device disposed between the storage system and the network.

13. The method of claim 2, wherein the network employs a protocol wherein the first identifier uniquely identifies the device in a manner that is independent of a physical configuration of the computer system and the second identifier uniquely identifies the device in a manner that is dependent upon the physical configuration of the computer system;

wherein the method further includes a step of storing the first and second identifiers of the first device in response to a login by the first device to the shared resource; and wherein the act (a) is performed in response to a login request, that occurs after the login by the first device, by the one of the plurality of devices to the shared resource and includes acts of:

examining a value of the first identifier presented by the one of the plurality of devices to the shared resource to determine that the one of the plurality of devices is representing itself to be the first device;

comparing a value of the second identifier presented by the one of the plurality of devices to the stored value of the second identifier for the first device; and determining that the one of the plurality of devices is attempting to login to the shared resource through a port of the at least one network component that is different than the first port when the value of the second identifier presented by the one of the plurality of devices mismatches the stored value of the second identifier for the first device.

14. The method of claim 13, wherein the shared resource is a storage system;

wherein the act (a) includes an act of, in response to the one of the plurality of devices attempting to login to the storage system and representing itself to the storage system as the first device, determining whether the one of the plurality of devices is attempting to login to the storage system through a port of the at least one network component that is different than a first port of the at least one network component used by the first device to access the storage system; and wherein the act (b) includes an act of, when it is determined in the act (a) that the one of the plurality of devices is attempting to login to the storage system through a port of the at least one network component that is different than the first port, denying the attempted login by the one of the plurality of devices to the storage system.

15. The method of claim 14, wherein the acts (a) and (b) are performed by the storage system.

16. The method of claim 14, wherein the acts (a) and (b) are performed by a device disposed between the storage system and the network.

17. The method of claim 3, wherein the shared resource is a storage system;

wherein the act (a) includes an act of, in response to the one of the plurality of devices attempting to access the storage system and representing itself to the storage system as a first device, determining whether the one of the plurality of devices is attempting to access the storage system through a physical connection to the at least one network component that is different than a first physical connection through the network used by the first device to access the storage system; and wherein the act (b) includes an act of, when it is determined in the act (a) that the one of the plurality of devices is attempting to access the storage system through a port of the at least one network component that is different than the first port, denying the attempted access by the one of the plurality of devices to the storage system.

18. The method of claim 17, wherein the acts (a) and (b) are performed by the storage system.

19. The method of claim 17, wherein the acts (a) and (b) are performed by a device disposed between the storage system and the network.

20. The method of claim 4, wherein the shared resource is a storage system;

wherein the act (a) includes an act of, in response to the one of the plurality of devices attempting to access the storage system and representing itself to the storage system as a first device, determining whether the one of the plurality of devices is attempting to access the storage system through a port of the at least one network component that is different than a first port of the at least one network component used by the first device to access the storage system; and wherein the act (b) includes an act of, when it is determined in the act (a) that the one of the plurality of devices is attempting to access the storage system through a port of the at least one network component that is different than the first port, denying the attempted access by the one of the plurality of devices to the storage system.

21. The method of claim 20, wherein the acts (a) and (b) are performed by the storage system.

22. The method of claim 20, wherein the acts (a) and (b) are performed by a device disposed between the storage system and the network.

23. A method for use in a computer system including a plurality of devices, a storage system shared by the plurality of devices, and a network that couples the plurality of devices to the storage system, wherein the network employs a protocol wherein each of the plurality of devices has a first identifier that uniquely identifies the device in a manner that is independent of a physical configuration of the computer system and a second identifier that uniquely identifies a port of at least one network component through which the respective device accesses the network, the method including acts of:
  (a) in response to a login of a first device of the plurality of devices to the storage system, storing the first and second identifiers of the first device;
  (b) in response to an attempt, subsequent to the act (a), by one of the plurality of devices to login to the storage system while representing itself to the storage system as the first device, determining whether the one of the plurality of devices is attempting to login to the storage system through a port of the at least one network component that is different than a first port of the at least one network component used by the first device to login to the storage system in the act (a), including acts of:
    (b1) examining a value of the first identifier presented by the one of the plurality of devices to the storage system to determine that the one of the plurality of devices is representing itself to be the first device;
    (b2) comparing a value of the second identifier presented by the one of the plurality of devices to the stored value of the second identifier for the first device; and
    (b3) determining that the one of the plurality of devices is attempting to login to the storage system through a port of the at least one network component that is different than the first port when the value of the second identifier presented by the one of the plurality of devices mismatches the stored value of the second identifier for the first device; and
  (c) when it is determined in the act (b3) that the one of the plurality of devices is attempting to login to the storage system through a port of the at least one network component that is different than the first port, denying the attempted login by the one of the plurality of devices to the storage system.

24. The method of claim 23, wherein the network is a Fibre Channel fabric, wherein the first identifier is a world wide name (WWN) and the second identifier is a fabric identifier (fabric ID);
  wherein the act (a) includes an act of, in response to a login of first device to the storage system, storing the WWN and the fabric ID of the first device;
  wherein the act (b1) includes an act of examining a value of the WWN presented by the one of the plurality of devices to determine that the one of the plurality of devices is representing itself to be the first device;
  wherein the act (b2) includes an act of comparing a value of the fabric ID presented by the one of the plurality of devices to the stored value of the fabric ID for the first device; and
  wherein the act (b3) includes an act of determining that the one of the plurality of devices is attempting to login to the storage system through a port of the at least one network component that is different than first port when the value of the fabric ID presented by the one of the plurality of devices mismatches the stored value of the fabric ID for the first device.

25. The method of claim 23, wherein the acts (a) and (b) are performed by the storage system.

26. The method of claim 23, wherein the acts (a) and (b) are performed by a device disposed between the storage system and the network.

27. A method for use in a computer system including a network and a plurality of devices coupled to the network, the network employing a protocol wherein each of the plurality of devices has a first identifier that uniquely identifies the device in a manner that is independent of a physical configuration of the computer system and a second identifier that uniquely identifies a port on at least one network component at which the respective device is connected, the at least one network component assigning a unique value for the second identifier to each of the plurality of devices that is logged into the network, the method including acts of:
  (a) in response to one of the plurality of devices attempting to login to the network and representing itself to the network as a first device, determining whether the one of the plurality of devices is attempting to login to the network through a port on the at least one network component that is different than a first port of the at least one network component through which the first device previously logged into the network; and
  (b) when it is determined in the act (a) that the one of the plurality of devices is attempting to access the network through a port that is different than the first port, denying the attempted login by the one of the plurality of devices to the network.

28. The method of claim 27, wherein the at least one network component includes at least one switch having a first switch port that forms the first port through which the first device previously logged into the network; and
  wherein the act (a) includes an act of, in response to the one of the plurality of devices attempting to login to the network and representing itself to the network as the first device, determining whether the one of the plurality of devices is attempting to login to the network through a port different than the first switch port.

29. The method of claim 27, further including an act of preventing at least one of the plurality of devices from transmitting information through the network while representing itself with a value for the second identifier that differs from its value assigned by the at least one network component.

30. The method of claim 27, wherein the network is a Fibre Channel fabric, wherein the first identifier is a world wide name (WWN) and the second identifier is a fabric identifier (fabric ID);
  wherein the method further includes an act of, in response to the previous login of the first device into the network, storing the WWN and the fabric ID of the first device; and wherein the act (a) includes acts of;
examining a value of the WWN presented by the one of the plurality of devices during the attempted login to determine that the one of the plurality of devices is representing itself to be the first device;
comparing a value of the fabric ID presented by the one of the plurality of devices to the stored value of the fabric ID for the first device; and
determining that the one of the plurality of devices is attempting to access the network through a port of the at least one network component that is different than the first port when the value of the fabric ID presented by the one of the plurality of devices mismatches the stored value of the fabric ID for the first device.

31. The method of claim 27, wherein the method further includes an act of, in response to the previous login of the first device into the network, storing the first and second identifiers of the first device; and
wherein the act (a) includes acts of;
examining a value of the first identifier presented by the one of the plurality of devices during the attempted login to determine that the one of the plurality of devices is representing itself to be the first device;
comparing a value of the second identifier presented by the one of the plurality of devices to the stored value of the second identifier for the first device; and
determining that the one of the plurality of devices is attempting to access the network through a port different than the first port when the value of the second identifier presented by the one of the plurality of devices mismatches the stored value of the second identifier for the first device.

32. An apparatus for use in a computer system including a plurality of devices, a shared resource shared by the plurality of devices each having a first identifier that uniquely identifies the respective device, and a network that couples the plurality of devices to the shared resource, the network assigning a second identifier to each of the plurality of devices, the second identifier indicating a port of at least one network component at which the respective device is connected, the apparatus including:
an input to be coupled to the network; and
at least one controller, coupled to the input, that is responsive to one of the plurality of devices attempting to access the shared resource while representing itself to the shared resource as a first device via the first identifier, to determine, based at least in part on the second identifier, whether the one of the plurality of devices is attempting to access the shared resource through a port of the at least one network component that is different than a first port of the at least one network component used by the first device to access the shared resource, and to deny the attempted access by the one of the plurality of devices to the shared resource when it is determined that the one of the plurality of devices is attempting to access the shared resource through a port of the at least one network component that is different than the first port.

33. The apparatus of claim 32, wherein the attempted access by the one of the plurality of devices is an attempt to login to the shared resource, and wherein the at least one controller denies the attempted login when it is determined that the one of the plurality of devices is attempting to login to the shared resource through a port of the at least one network component that is different than the first port.

34. The apparatus of claim 32, wherein the network is a Fibre Channel fabric, wherein the first identifier includes a world wide name (WWN) and the second identifier includes a fabric identifier (fabric ID);
wherein the apparatus further includes a storage device coupled to the at least one controller;
wherein the at least one controller stores the WWN and the fabric ID of the first device in the storage device in response to an access by the first device to the shared resource; and
wherein when the one of the plurality of devices attempts to access the shared resource after the access by the first device, the at least one controller:
examines a value of the WWN presented by the one of the plurality of devices to the shared resource to determine that the one of the plurality of devices is representing itself as being the first device;
compares a value of the fabric ID presented by the one of the plurality of devices to the stored fabric ID for the first device; and
determines that the one of the plurality of devices is attempting to access the shared resource through a port of the at least one network component that is different than the first port when the value of the fabric ID presented by the one of the plurality of devices mismatches the stored fabric ID for the first device.

35. The apparatus of claim 32, wherein the network employs a protocol wherein the first identifier uniquely identifies the device in a manner that is independent of a physical configuration of the computer system and the second identifier uniquely identifies the device in a manner that is dependent upon the physical configuration of the computer system;
wherein the apparatus further includes a storage device coupled to the at least one controller;
wherein the at least one controller stores the first and second identifiers of the first device in the storage device in response to an access by the first device to the shared resource; and
wherein when the one of the plurality of devices attempts to access the shared resource after the access by the first device, the at least one controller:
examines a value of the first identifier presented by the one of the plurality of devices to the shared resource to determine that the one of the plurality of devices is representing itself to be the first device;
compares a value of the second identifier presented by the one of the plurality of devices to the stored value of the second identifier for the first device; and
determines that the one of the plurality of devices is attempting to access the shared resource through a port of the at least one network component that is different than the first port when the value of the second identifier presented by the one of the plurality of devices mismatches the stored value of the second identifier for the first device.

36. The apparatus of claim 32, wherein the shared resource is a storage system;
wherein in response to the one of the plurality of devices attempting to access the storage system and representing itself to the storage system as a first device, the at least one controller determines whether the one of the plurality of devices is attempting to access the storage system through a port of the at least one network component that is different than the first port; and wherein when it is determined that the one of the plurality of devices is attempting to access the storage system through a port of the at least one network component that is different than the first port the at least one controller denies the attempted access by the one of the plurality of devices to the storage system.

37. The apparatus of claim 36, in combination with the storage system, wherein the at least one controller and the input each is disposed within the storage system.

38. The apparatus of claim 36, wherein the at least one controller and the input each is disposed outside of the storage system.

39. The apparatus of claim 38, wherein the apparatus includes a filter unit that includes the input and the at least one controller and is adapted to be disposed between the storage system and the network.

40. The apparatus of claim 33, wherein the network is a Fibre Channel fabric and wherein the first identifier includes a world wide name (WWN) and the second identifier includes a fabric identifier (fabric ID);
   wherein the at least one controller stores the WWN and the fabric ID of the first device in response to a login by the first device to the shared resource; and
   wherein when the one of the plurality of devices attempts to login to the shared resource after the login by the first device, the at least one controller:
      examines a value of the WWN presented by the one of the plurality of devices to the shared resource to determine that the one of the plurality of devices is representing itself as being the first device;
      compares a value of the fabric ID presented by the one of the plurality of devices to the stored fabric ID for the first device; and
      determines that the one of the plurality of devices is attempting to login to the shared resource through a port of the at least one network component that is different than the first port when the value of the fabric ID presented by the one of the plurality of devices mismatches the stored fabric ID for the first device.

41. The apparatus of claim 40, wherein the shared resource is a storage system;
   wherein in response to the one of the plurality of devices attempting to login to the storage system and representing itself to the storage system as a first device, the at least one controller determines whether the one of the plurality of devices is attempting to login to the storage system through a port of the at least one network component that is different than the first port; and
   wherein when it is determined that the one of the plurality of devices is attempting to login to the storage system through a port of the at least one network component that is different than the first port the at least one controller denies the attempted login by the one of the plurality of devices to the storage system.

42. The apparatus of claim 41, in combination with the storage system, wherein the at least one controller and the input each is disposed within the storage system.

43. The apparatus of claim 41, wherein the apparatus includes a filter unit that includes the input and the at least one controller and is adapted to be disposed between the storage system and the network.

44. The apparatus of claim 33, wherein the network employs a protocol wherein the first identifier uniquely identifies the device in a manner that is independent of a physical configuration of the computer system and the second identifier uniquely identifies the device in a manner that is dependent upon the physical configuration of the computer system;
   wherein the apparatus further includes a storage device coupled to the at least one controller;
   wherein the at least one controller stores the first and second identifiers of the first device in the storage device in response to a login by the first device to the shared resource; and
   wherein when the one of the plurality of devices attempts to login to the shared resource after the login by the first device, the at least one controller:
      examines a value of the first identifier presented by the one of the plurality of devices to the shared resource to determine that the one of the plurality of devices is representing itself to be the first device;
      compares a value of the second identifier presented by the one of the plurality of devices to the stored value of the second identifier for the first device; and
      determines that the one of the plurality of devices is attempting to login to the shared resource through a port of the at least one network component that is different than the first port when the value of the second identifier presented by the one of the plurality of devices mismatches the stored value of the second identifier for the first device.

45. The apparatus of claim 44, wherein the shared resource is a storage system;
   wherein in response to the one of the plurality of devices attempting to login to the storage system and representing itself to the storage system as a first device, the at least one controller determines whether the one of the plurality of devices is attempting to login to the storage system through a port of the at least one network component that is different than the first physical connection; and
   wherein when it is determined that the one of the plurality of devices is attempting to login to the storage system through a port of the at least one network component that is different than the first port the at least one controller denies the attempted login by the one of the plurality of devices to the storage system.

46. The apparatus of claim 45, in combination with the storage system, wherein the at least one controller and the input each is disposed within the storage system.

47. The apparatus of claim 45, wherein the apparatus includes a filter unit that includes the input and the at least one controller and is adapted to be disposed between the storage system and the network.

48. The apparatus of claim 34, wherein the shared resource is a storage system;
   wherein in response to the one of the plurality of devices attempting to access the storage system and representing itself to the storage system as a first device, the at least one controller determines whether the one of the plurality of devices is attempting to access the storage system through a port of the at least one network component that is different than the first port; and
   wherein when it is determined that the one of the plurality of devices is attempting to access the storage system through a port of the at least one network component that is different than the first port the at least one controller denies the attempted access by the one of the plurality of devices to the storage system.

49. The apparatus of claim 48, in combination with the storage system, wherein the at least one controller and the input each is disposed within the storage system.

50. The apparatus of claim 48, wherein the apparatus includes a filter unit that includes the input and the at least one controller and is adapted to be disposed between the storage system and the network.

51. The apparatus of claim 35, wherein the shared resource is a storage system;
wherein in response to the one of the plurality of devices attempting to access the storage system and representing itself to the storage system as a first device, the at least one controller determines whether the one of the plurality of devices is attempting to access the storage system through a port of the at least one network component that is different than the first port; and
wherein when it is determined that the one of the plurality of devices is attempting to access the storage system through a port of the at least one network component that is different than the first port the at least one controller denies the attempted access by the one of the plurality of devices to the storage system.

52. The apparatus of claim 51, in combination with the storage system, wherein the at least one controller and the input each is disposed within the storage system.

53. The apparatus of claim 51, wherein the apparatus includes a filter unit that includes the input and the at least one controller and is adapted to be disposed between the storage system and the network.

54. The apparatus of claim 32, wherein the at least one controller includes:
means, responsive to the one of the plurality of devices attempting to access the shared resource while representing itself to the shared resource as a first device, for determining whether the one of the plurality of devices is attempting to access the shared resource through a port of the at least one network component that is different than a first port of the at least one network component used by the first device to access the shared resource; and
means for denying the attempted access by the one of the plurality of devices to the shared resource when it is determined that the one of the plurality of devices is attempting to access the shared resource through a port of the at least one network component that is different than the first port.

55. The apparatus of claim 33, wherein the shared resource is a storage system;
wherein in response to the one of the plurality of devices attempting to login to the storage system and representing itself to the storage system as a first device, the at least one controller determines whether the one of the plurality of devices is attempting to login to the storage system through a port of the at least one network component that is different than the first port; and
wherein when it is determined that the one of the plurality of devices is attempting to login to the storage system through a port of the at least one network component that is different than the first port the at least one controller denies the attempted login by the one of the plurality of devices to the storage system.

56. The method of claim 2, wherein the shared resource is a storage system;
wherein the act (a) includes an act of, in response to the one of the plurality of devices attempting to login to the storage system and representing itself to the storage system as the first device, determining whether the one of the plurality of devices is attempting to login to the storage system through a port of the at least one network component that is different than a first port of the at least one network component that the first device uses to login to the storage system; and
wherein the act (b) includes an act of, when it is determined in the act (a) that the one of the plurality of devices is attempting to login to the storage system through a port of the at least one network component that is different than the first port, denying the attempted login by the one of the plurality of devices to the storage system.

57. An apparatus for use in a computer system including a plurality of devices, a storage system shared by the plurality of devices, and a network that couples the plurality of devices to the storage system, wherein the network employs a protocol wherein each of the plurality of devices has a first identifier that uniquely identifies the device in a manner that is independent of a physical configuration of the computer system and a second identifier that uniquely identifies a port on at least one network component through which the respective device connects to the network, the apparatus comprising:
an input to be coupled to the network;
a storage device; and
at least one controller, coupled to the network and the storage device, that is responsive to a login of a first device of the plurality of devices to the storage system to store the first and second identifiers of the first device in the storage device;
the at least one controller further being responsive to an attempt, after the login by the first device, by one of the plurality of devices to login to the storage system, while representing itself to the storage system as the first device, to;
examine a value of the first identifier presented by the one of the plurality of devices to the storage system to determine that the one of the plurality of devices is representing itself to be the first device;
compare a value of the second identifier presented by the one of the plurality of devices to the stored value of the second identifier for the first device;
determine that the one of the plurality of devices is attempting to access the storage system through a port of the at least one network component that is different than a first port of the at least one network component used by the first device in logging into the storage system when the value of the second identifier presented by the one of the plurality of devices mismatches the stored value of the second identifier for the first device; and
deny the attempted login by the one of the plurality of devices to the storage system when it is determined that the one of the plurality of devices is attempting to login to the storage system through a port of the at least one network component that is different than the first port.

58. The apparatus of claim 57, wherein the network is a Fibre Channel fabric, wherein the first identifier is a world wide name (WWN) and the second identifier is a fabric identifier (fabric ID);
wherein the at least one controller stores the WWN and the fabric ID of the first device in the storage device in response to the login by the first device to the storage system; and
wherein when the one of the plurality of devices attempts to login to the storage system after the login by the first device, the at least one controller:
examines a value of the WWN presented by the one of the plurality of devices to the storage system to determine that the one of the plurality of devices is representing itself as being the first device;

compares a value of the fabric ID presented by the one of the plurality of devices to the stored fabric ID for the first device; and determines that the one of the plurality of devices is attempting to access the storage system through a port of the at least one network component that is different than the first port when the value of the fabric ID presented by the one of the plurality of devices mismatches the stored fabric ID for the first device.

59. The apparatus of claim 57, in combination with the storage system, wherein the at least one controller, the storage device and the input each is disposed within the storage system.

60. The apparatus of claim 57, further including a filter unit that includes the input and the at least one controller and is adapted to be disposed between the storage system and the network.

61. The apparatus of claim 57, wherein the at least one controller includes:

means, responsive to the login of a first device of the plurality of devices to the storage system, to store the first and second identifiers of the first device in the storage device;

means, responsive to an attempt, after the login by the first device, by one of the plurality of devices to login to the storage system, while representing itself to the storage system as the first device, for examining a value of the first identifier presented by the one of the plurality of devices to the storage system to determine that the one of the plurality of devices is representing itself to be the first device and for comparing a value of the second identifier presented by the one of the plurality of devices to the stored value of the second identifier for the first device;

means for determining that the one of the plurality of devices is attempting to access the storage system through a port of the at least one network component that is different than a first port used by the first device in logging into the storage system when the value of the second identifier presented by the one of the plurality of devices mismatches the stored value of the second identifier for the first device; and means for denying the attempted login by the one of the plurality of devices to the storage system when it is determined that the one of the plurality of devices is attempting to login to the storage system through a port of the at least one network component that is different than the first port.

62. An apparatus for use in a computer system including a network and a plurality of devices coupled to the network, the network employing a protocol wherein each of the plurality of devices has a first identifier that uniquely identifies the device in a manner that is independent of a physical configuration of the computer system and a second identifier that uniquely identifies a port of at least one network component at which the respective device is connected, the at least one network component assigning a unique value for the second identifier to each of the plurality of devices that is logged into the network, the apparatus comprising:

at least one input to be coupled to at least one of the plurality of devices; and at least one controller that is responsive to one of the plurality of devices attempting to login to the network and representing itself to the network as a first device, to determine whether the one of the plurality of devices is attempting to login to the network through a port that is different than a first port of the at least one network component through which the first device previously logged into the network, and to deny the attempted login by the one of the plurality of devices to the network when the one of the plurality of devices is attempting to login to the network through a port of the at least one network component that is different than the first port.

63. The apparatus of claim 62, in combination with a network switch to form at least a portion of the network, wherein the at least one controller is disposed within the switch.

64. The apparatus of claim 62, wherein the at least one controller prevents at least one of the plurality of devices from transmitting information through the network while representing itself with a value for the second identifier that differs from its value assigned by the at least one network component.

65. The apparatus of claim 62, wherein the network is a Fibre Channel fabric, wherein the first identifier is a world wide name (WWN) and the second identifier is a fabric identifier (fabric ID);

wherein the apparatus further includes a storage device coupled to the at least one controller;

wherein the at least one controller stores the WWN and the fabric ID of the first device in response to the login of the first device into the network; and wherein when the one of the plurality of devices attempts to login to the shared resource after the login by the first device, the at least one controller:

examines a value of the WWN presented by the one of the plurality of devices during the attempted login to determine that the one of the plurality of devices is representing itself to be the first device;

compares a value of the fabric ID presented by the one of the plurality of devices to the stored value of the fabric ID for the first device; and determines that the one of the plurality of devices is attempting to access the network through a port of the at least one network component that is different than the first port when the value of the fabric ID presented by the one of the plurality of devices mismatches the stored value of the fabric ID for the first device.

66. The apparatus of claim 62, wherein the apparatus further includes a storage device coupled to the at least one controller;

wherein the at least one controller stores the first and second identifiers of the first device in response to the login of the first device into the network; and wherein when the one of the plurality of devices attempts to login to the shared resource after the login by the first device, the at least one controller:

examines a value of the first identifier presented by the one of the plurality of devices during the attempted login to determine that the one of the plurality of devices is representing itself to be the first device;

compares a value of the second identifier presented by the one of the plurality of devices to the stored value of the second identifier for the first device; and determines that the one of the plurality of devices is attempting to access the network through a port of the at least one network component different than the first port when the value of the second identifier presented by the one of the plurality of devices mismatches the stored value of the second identifier for the first device.

* * * * *